(12) United States Patent
Lee

(10) Patent No.: US 12,344,354 B2
(45) Date of Patent: Jul. 1, 2025

(54) HUB-TYPE ELECTRIC DRIVING DEVICE

(71) Applicant: AMOTECH CO., LTD., Incheon (KR)

(72) Inventor: Jeong Hoon Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 684 days.

(21) Appl. No.: 17/775,882

(22) PCT Filed: Nov. 3, 2020

(86) PCT No.: PCT/KR2020/015214
§ 371 (c)(1),
(2) Date: May 10, 2022

(87) PCT Pub. No.: WO2021/096143
PCT Pub. Date: May 20, 2021

(65) Prior Publication Data
US 2022/0388599 A1     Dec. 8, 2022

(30) Foreign Application Priority Data

Nov. 13, 2019   (KR) ........................ 10-2019-0145103
Nov. 29, 2019   (KR) ........................ 10-2019-0157447

(51) Int. Cl.
    *B62M 6/65*          (2010.01)
    *B62M 6/80*          (2010.01)

(52) U.S. Cl.
    CPC ................ *B62M 6/65* (2013.01); *B62M 6/80* (2013.01)

(58) Field of Classification Search
    CPC .. B62M 6/65; B62M 6/80; B62M 6/50; B62L 1/005; H02K 1/146; H02K 1/187;
(Continued)

(56) References Cited

U.S. PATENT DOCUMENTS 6,278,216 B1    8/2001   Li
8,657,047 B2 *   2/2014   Urabe ...................... B60L 7/14
                                                   301/6.5
(Continued)

FOREIGN PATENT DOCUMENTS

CN         109412326 A   *   3/2019
CN         208806688         4/2019
(Continued)

OTHER PUBLICATIONS

Translated CN-208904826-U (Year: 2025).*
(Continued)

*Primary Examiner* — James A Shriver, II
*Assistant Examiner* — Ian Bryce Shelton
(74) *Attorney, Agent, or Firm* — CANTOR COLBURN LLP

(57) ABSTRACT

Provided is a hub-type electric driving device including: a housing having a wheel formed in the shape of a cup, and a cover whose outer peripheral part is coupled to the opening of the wheel; a motor shaft having both end portions fixed on a body outside of the housing; first and second bearings provided respectively in through-holes formed in the centers of the wheel and the cover; and a BLDC motor embedded inside the housing and rotating the housing around the motor shaft. The BLDC motor includes: a rotor in which a back yoke and a magnet are stacked on a cylindrical inner wall of the wheel; and a stator whose outer peripheral part faces the magnet of the rotor while having an air gap therewith and whose central part is coupled to the outer circumference of the motor shaft.

14 Claims, 18 Drawing Sheets

(58) Field of Classification Search
CPC .......... H02K 3/28; H02K 3/325; H02K 3/345; H02K 3/522; H02K 7/14; H02K 21/222; H02P 6/00
See application file for complete search history.

(56) References Cited

U.S. PATENT DOCUMENTS

| | | | | |
|---|---|---|---|---|
| 8,917,006 | B2* | 12/2014 | Jang | H02K 3/345 |
| | | | | 310/214 |
| 10,374,479 | B2* | 8/2019 | Lee | H02K 3/522 |
| 10,536,051 | B2* | 1/2020 | Michel | H02K 7/14 |
| 10,873,238 | B2* | 12/2020 | Takemoto | H02K 3/325 |
| 10,933,945 | B2* | 3/2021 | Lin | B60L 53/16 |
| 10,981,624 | B2* | 4/2021 | Lin | H02K 7/006 |
| 11,214,332 | B2* | 1/2022 | Lin | B60L 53/12 |
| 11,569,704 | B2* | 1/2023 | Nam | B60B 21/00 |
| 2011/0303471 | A1* | 12/2011 | Urabe | B60L 50/20 |
| | | | | 180/65.51 |
| 2012/0169173 | A1* | 7/2012 | Jang | H02K 3/345 |
| | | | | 310/215 |
| 2013/0009513 | A1* | 1/2013 | Jang | H02K 3/522 |
| | | | | 310/254.1 |
| 2016/0322926 | A1* | 11/2016 | Dhawan | B60L 50/20 |
| 2017/0110933 | A1* | 4/2017 | Michel | H02K 1/187 |
| 2017/0222513 | A1* | 8/2017 | Lee | H02K 3/345 |
| 2019/0131840 | A1* | 5/2019 | Tago | H02K 21/16 |
| 2019/0185106 | A1* | 6/2019 | Lin | H02K 11/24 |
| 2019/0202526 | A1* | 7/2019 | Lin | B60L 50/66 |
| 2019/0315241 | A1* | 10/2019 | Lin | H02K 21/22 |
| 2020/0067373 | A1* | 2/2020 | Takemoto | H02K 1/2791 |
| 2020/0373806 | A1* | 11/2020 | Nam | H02K 21/22 |

FOREIGN PATENT DOCUMENTS

| | | | | |
|---|---|---|---|---|
| CN | 208806688 | U * | 4/2019 | |
| CN | 208904826 | | 5/2019 | |
| CN | 208904826 | U * | 5/2019 | |
| EP | 2394903 | A1 * | 12/2011 | .............. B60L 50/20 |
| EP | 3290248 | A1 * | 3/2018 | ......... B60B 27/0073 |
| KR | 200249721 | | 11/2001 | |
| KR | 20060063024 | | 6/2006 | |
| KR | 20110122648 | | 11/2011 | |
| KR | 20110139552 | | 12/2011 | |
| KR | 20120096634 | | 8/2012 | |
| KR | 20120096634 | A * | 8/2012 | |
| KR | 20140119296 | | 10/2014 | |
| KR | 20140119296 | A * | 10/2014 | |
| KR | 20160086698 | A * | 7/2016 | |
| KR | 20190007907 | | 1/2019 | |
| KR | 20190048470 | | 5/2019 | |
| KR | 20190048470 | A * | 5/2019 | |
| WO | WO-2019130904 | A1 * | 7/2019 | .............. B60B 3/02 |
| WO | WO-2019235203 | A1 * | 12/2019 | |

OTHER PUBLICATIONS

Translated KR-20120096634-A (Year: 2025).*
Translated KR-20140119296-A (Year: 2025).*
Translated KR-20190048470-A (Year: 2025).*
International Search Report—PCT/KR2020/015214 dated Jan. 27, 2021.

* cited by examiner

HUB-TYPE ELECTRIC DRIVING DEVICE

TECHNICAL FIELD

The present invention relates to a hub-type electric driving device and, more specifically, to a hub-type electric driving device having a driving motor contained in a housing which also functions as a motor casing.

BACKGROUND ART

An electric bicycle is equipped with a direct-current (DC) motor on a wheel hub or a crank shaft of a general bicycle and assists power, thereby enabling pleasant driving in a plain road and an uphill road.

The standard for the application range of the electric bicycle refers to a two-wheeled bicycle with electric motor power to supplement the human power. The electric bicycle has necessarily a pedal driving function, while moving with electric motor power, and is classified as follows according to the driving method.

First, a throttle mode: A bicycle that is moved only on the power of an electric motor by operating an electric bicycle accelerator lever.

Second, a pedal assist system (PAS) mode: A bicycle that is moved by simultaneous power of an electric bicycle pedal and an electric motor.

Third, a throttle/PAS combination mode: A bicycle that support both a throttle mode and a PAS mode.

The throttle mode electric bicycle can control the speed of the bicycle from a low speed to a high speed by controlling the rotational force of the motor by manipulating an accelerator. The driving mode by the accelerator is referred to as a scooter mode.

A pedal assistance system (PAS) mode electric bicycle employs a PAS mode for automatically rotating a motor by sensing a pedal when the pedal is driven. A torque sensor measures a pedal effort applied to a pedal by a bicycle driver and provides the calculated torque information to an electric bicycle controller. As the pedal effort applied to the pedal increases, the output of the motor also increases. The driver can actively control the DC motor output of the electric bicycle by adjusting the pedal effort applied to the pedal by the driver.

A hub type driving motor having a motor embedded in a hub for driving an electric vehicle and an electric motorcycle including the electric bicycle is presented in Korean Patent Publication No. 10-2012-0096634 (Patent document 1).

Patent document 1 discloses a technology in which a double-rotor and single-stator type BLDC motor is embedded in a motor casing composed of a casing body and a casing cover, the BLDC motor in which a single-stator is coupled to a motor shaft and a double-rotor is installed in the motor casing, which rotates the motor casing around the motor shaft, and an S-pole inner magnet of an internal rotor and an N-pole outer magnet of an external rotor are deflected at a preset angle, to improve the initial maneuverability of the motor.

Patent document 1 is a double-rotor and single-stator type BLDC motor in which both ends of the motor shaft are fixedly coupled to the frame of a body and the motor casing rotates around the fixed motor shaft.

A hub-type electric driving device, such as an electric vehicle, an electric motorcycle, an electric bicycle, and the like, has a structure in which an electric motor is contained in a housing, which also functions as a motor casing, and the housing is rotated in contact with the ground through a tire.

Therefore, a mutual coupling structure between the rotor, the stator, and the motor shaft contained in the housing as well as the housing is required to have structural rigidity capable of enduring impact, vibration, dynamic and static loads.

Patent document 1 has a structure in which an inner rotor and an outer rotor are integrally formed in a casing body, a stator is arranged between the inner rotor and the outer rotor, and is coupled between a stator frame extending axially from the stator and a stator connection portion extended to the outer circumference of the motor shaft, and thus due to weak coupling force between the stator and the motor shaft, durability may be reduced.

In addition, in Patent document 1, an asymmetric double-rotor and single-stator type BLDC motor is embedded in the motor casing, and thus the center of gravity of the motor is biased, which may cause partial wear or noise generation.

Moreover, it is difficult to implement an environment capable of cooling electric components inside the housing that also serves as a motor casing, and thus it is preferable that a control unit (i.e., the driver, etc.) for controlling the electric motor is minimally left, and the rest of the control unit is disposed outside the housing.

In addition, the BLDC motor of Patent document 1 has a motor shaft having a hollow or solid shaft shape, and includes: a shaft front portion for supporting a bearing for a casing cover; a circular plate-shaped stator shaft connection portion protruding from the circumferential surface of the rear side of the shaft front portion; and a shaft rear portion having a circular block shape of a relatively large diameter relative to the shaft front portion so as to support a bearing for a casing body at the rear side of the stator shaft connection portion, wherein an inlet hole for passing a power line is formed at the shaft rear portion.

In general, an electric vehicle, an electric motorcycle, an electric bicycle, or the like has an electric motor built in a hub for the rotation of a wheel, and a power supply battery which is installed outside the hub.

In the BLDC motor of Patent document 1, a power line for supplying power from the outside of the motor casing is connected to a control unit through the inside of the motor shaft having a hollow or solid shaft shape. Patent document 1 discloses a structure in which a power line passes through a inlet hole in the shaft rear portion of the motor shaft, but a sealing method of the inlet hole through which the power line passes has not been proposed.

In general, since the motor shaft is made of a high-strength metal material, precision processing is not easy, and since it is difficult to install a sealing O-ring or the like inside the inlet hole of the motor shaft, it is difficult to completely seal the power line passing region of the inlet hole when the power line passes through the inlet hole. In the case of employing a separate sealing structure, cable extension through the inlet hole has a problem of degrading the productivity of the assembly operation.

Meanwhile, in a BLDC motor having a split-core stator, A motor in which coils are alternately arranged for each phase in one split core in which coils are wound for each phase, or in an integrated stator core, coils are alternately wound on teeth for each phase is referred to as a one-connection type motor.

In the one-connection type motor, as the number of slots is reduced in the rotor, the magnetic fields are not offset at a portion where adjacent S-pole magnets and N-pole magnets overlap, thereby generating noise.

In addition, the BLDC motor designed according to the conventional one-connection method has slots and poles of the motor, which are set to 12 poles in 18 slots, 36 poles in 27 slots, and 48 poles in 36 slots, and the ratio of the number of slots to the number of poles is 30% to 40%. Therefore, the effective area difference of the magnetic force (magnetic flux) between the magnet and the core occurs according to the rotation angle when the rotor is rotated. As a result, cogging is severely generated and magnetic flux leakage occurs.

In addition, a "two-connection type motor" using a stator has been proposed in which two-connection type coils are sequentially wound for each phase on the teeth of an integrated stator core of the stator where the winding order of the coils is forward and then backward.

The two-connection type motor has a problem in that the cogging noise is smaller than that of the one-connection type motor, but the number of connection points is increased than that of a three-connection type motor. Therefore, the two-connection type motor has been applied for the purpose of reducing cogging rather than improving efficiency.

As described above, the conventional one-connection or two-connection type motor has a problem in common in that cogging noise is high, efficiency is low, and the number of connection points is increased.

DISCLOSURE

Technical Problem

It is an object of the present invention to provide a hub-type electric driving device having structural rigidity capable of withstanding impact, vibration, and dynamic and static loads applied to a housing as well as even a mutual coupling structure among a rotor, a stator, and a motor shaft contained in the housing.

Another object of the present invention is to provide a hub-type electric driving device having improved assembly and durability by using an integrated core frame in which a plurality of teeth are radially extended on the outer circumference of an annular yoke of a stator and an inner ring coupled to a motor shaft is connected to the inside of the annular yoke through a plurality of bridges.

Another object of the present invention is to provide a hub-type electric driving device which has a balanced support structure without deflection of a rotor fixed to a wheel and a stator fixed to a motor shaft in an axial direction and a circumferential direction, which may prevent partial wear or suppress noise generation.

Another object of the present invention is to provide a hub-type electric driving device capable of performing coil windings without a connection point between coils as all the coil windings are continuously performed at a time at the time of winding three-phase coils on the teeth of an integrated stator core by a three-connection method.

Another object of the present invention is to provide a hub-type electric driving device capable of reducing resistance and coil loss by minimizing the resistance of coils by a parallel connection between respective core groups when the coils are wound by a three-connection method, thereby reducing the coil temperature and increasing the efficiency, and capable of realizing high-speed RPM by securing the number of turns of thin wires in diameter in a two-connection method.

Another object of the present invention is to provide a hub-type electric driving device capable of minimizing a ratio of slots of a stator to poles of a rotor to achieve low cogging noise and an increase in efficiency.

Another object of the present invention is to provide a hub-type electric driving device using a cable guide bracket coupled to the outside of a motor shaft by withdrawing a cable through a cable through-hole penetrating the inside and the outside of a wheel, thereby facilitating the withdrawing and sealing of the cable.

Technical Solution

According to an embodiment of the present invention, there is provided a hub-type electric driving device including: a housing having a wheel formed in the shape of a cup, and a cover of which the outer peripheral part is coupled to the opening of the wheel; a motor shaft having both end portions fixedly provided on a body outside of the housing; first and second bearings provided respectively in through-holes formed in the centers of the wheel and the cover, in order to rotatably support the housing around the motor shaft; and a BLDC motor which is embedded inside the housing and rotates the housing around the motor shaft, wherein the BLDC motor includes: a rotor in which a back yoke and a magnet are stacked on a cylindrical inner wall of the cup-shaped wheel; and a stator of which the outer peripheral part faces the magnet of the rotor while having an air gap therewith and of which the central part is coupled to the outer circumference of the motor shaft so as to be fixed thereto, and which is for applying a rotating magnetic field to the rotor, wherein the stator includes an integrated core frame in which a plurality of teeth radially extend on the outer circumference of an annular yoke, and an inner race coupled to the motor shaft is connected to the inside of the annular yoke through a plurality of bridges.

The stator includes: an integrated core frame; an insulating film surrounding four side surfaces of the plurality of teeth except the outer circumferential surface facing the magnet of the rotor; first and second insulators, each having an annular body and a plurality of extensions radially extending from the annular body to correspond to the plurality of teeth and the annular yoke, and assembled to one side and the other side of the integrated core frame; and coils wound around the teeth portion surrounded by the insulating film and the first and second insulators.

According to an embodiment of the present invention, there is provided a hub-type electric driving device further including: a common terminal which is insert-molded into the annular body so that three common terminal ends protrude above the annular body, and forms a neutral point when the three-phase (U, V, W) coils are connected in a Y-connection manner; and U-phase, V-phase and W-phase terminal ends which are integrally formed in the annular body and are connected to the input ends of the three-phase (U, V, W) coils.

In this case, the first insulator further includes an annular extension portion extending inward of the annular body, and The annular extension portion may include three nuts embedded to fix a bolt for a bus bar and connected to the U-phase, V-phase, and W-phase terminal ends, respectively.

In addition, a plurality of winding guide protrusions serving as a guide of the coils when the coils are wound on the plurality of teeth may be integrally formed in the annular body.

Further, the BLDC motor includes a single rotor having a 20-pole structure and a single stator having an 18-slot structure. The stator includes three-phase (U, V, W) coils wound on 18 teeth. Each of the three-phase (U, V, W) coils includes six core groups continuously wound on three teeth. When the three-phase (U, V, W) coils are wound on the 18 teeth with one-time winding, the three-phase (U, V, W) coils may be wound so that an input of the core group of each phase is commonly connected to a terminal end of each phase, and an output of the core group of each phase is connected to a common terminal for forming a neutral point.

According to an embodiment of the present invention, the stator includes three-phase (U, V, W) coils wound around a plurality of teeth. Each of the three-phase (U, V, W) coils includes a plurality of core groups continuously wound on three teeth. Each of the core groups is wound continuously on three consecutive teeth in the order of forward, reverse, and forward. Six consecutive teeth of two adjacent phases generate magnetic flux in opposite directions to rotate the magnets of the opposing rotor in the same direction. When a driving signal is applied to the coil of the stator in a six-step manner, six consecutive teeth of two phases may be set to an activated state, and the three consecutive teeth of the remaining one phase arranged between the six consecutive teeth may be set to an inactive state.

The stator includes three-phase (U, V, W) coils wound on a plurality of teeth. Each of the three-phase (U, V, W) coils includes a plurality of core groups continuously wound on three teeth. The core groups of each phase may be connected in parallel and may be alternately arranged for each phase.

In this case, the three-phase (U, V, W) coils wound in the plurality of teeth may be wound in one-time winding, and may be wound using two-stranded wires.

In addition, six consecutive teeth included in two adjacent core groups can be set to the same polarity or opposite polarity as the magnetic pole of the opposing rotor when the drive signal is applied thereto, thereby rotating the rotor in the same direction.

The hub-type electric driving device according to an embodiment of the present invention, further includes an O-ring formed on the outer circumference of the motor shaft to set a sealing state between the second bearing and the motor shaft.

The cable guide assembly includes: a cable guide bracket which is installed between the first bearing and the motor shaft, and has a shaft through-hole formed in the center thereof and through which the motor shaft is penetrated and coupled, and a cable through-hole deflected to one side from the shaft through-hole and through which the cable passes; a silicon rubber ring inserted into the cable through-hole and fitted to the outer circumference of the cable; and a cable bracket cover fitted into the cable through-hole so that the front end portion thereof fixes the silicon rubber ring.

In addition, the cable guide bracket includes: a body in which the shaft through-hole and the cable through-hole are formed; a cylindrical tube extending from the body to the outside of the wheel so that the shaft through-hole is longer than the cable through-hole; and an annular flange extending inside the wheel and serving as a stopper caught by the inner circumference of the first bearing, wherein the cable through-hole may have a stepped portion that limits the position of the silicon rubber ring when the cable bracket cover is inserted into the cable through-hole.

The hub-type electric driving device according to the present invention may be used in any one of an electric bicycle, an electric vehicle, an electric motorcycle, an electric scooter, and an electric kickboard.

Advantageous Effects

As described above, the present invention is applied to a hub-type driving motor in which a motor is embedded in a housing which also serves as a motor casing for driving an electric bicycle, an electric vehicle, an electric motorcycle, an electric scooter, and an electric kickboard.

Therefore, the present invention has a structural rigidity capable of enduring impact, vibration, and dynamic and static loads applied to a housing as well as even a mutual coupling structure among the rotor, the stator, and the motor shaft contained in the housing.

Further, the present invention may improve assembly and durability by using an integrated core frame in which a plurality of teeth are radially extended on the outer circumference of an annular yoke of a stator and an inner ring coupled to a motor shaft is connected to the inside of the annular yoke through a plurality of bridges.

Further, the present invention has a balanced support structure without deflection of a rotor fixed to a wheel and a stator fixed to a motor shaft in an axial direction and a circumferential direction, which may prevent partial wear or suppress noise generation.

According to the present invention, the Hall sensor and the temperature sensor for sensing the rotor rotation position necessary for driving the BLDC motor are mounted on the Hall sensor assembly installed inside the housing and the remaining motor driving circuit (control unit, etc.) required to drive the BLDC motor may be arranged in the body outside the housing, thereby facilitating the heat dissipation of the motor driving circuit (the control unit, etc.), and stably supporting the BLDC motor by avoiding the impact and vibration environment.

Conventionally, in order to connect to a stator inside a motor casing (housing), a power line is supplied through the inside of the motor shaft having a hollow or solid shaft shape. When the motor embedded in the motor casing (housing) is a three-phase driving BLDC motor, a three-phase driving signal supply wire to the BLDC motor and a plurality of signal line wires for controlling motor driving from a driving circuit (driver) disposed outside the motor casing (housing) should also be drawn out. Therefore, when the plurality of wires are embedded in one cable, the diameter of the cable increases, and thus the method of withdrawing the cable through the inside of the motor shaft is not easy to form the workability and the sealing structure.

According to the present invention, the cable guide bracket coupled to the outside of the motor shaft is used to introduce the cable through the cable through-hole penetrating the inside and the outside of the wheel, thereby facilitating the introduction and sealing of the cable.

In the present invention, when three-phase coils are wound on the teeth of the integrated stator core in a three-connection method in which the coils are continuously wound on the three teeth in the order of a forward direction, a reverse direction, and a forward direction for each core group of each phase, all coil windings are continuously performed at a time, and thus the coil windings may be performed without connection points, thereby increasing productivity and reducing costs.

In addition, in the present invention, as reverse coil winding is performed on the core (teeth) located in the middle of the three consecutive cores (teeth), when the motor driving signal of the same phase is applied to the three consecutive coils, all three cores (teeth) generate a magnetic flux that rotates the magnet of the opposing rotor in the same direction, thereby effectively transmitting a force to the rotor.

Moreover, in the present invention, coil winding is performed in a three-connection method, so that the three cores (teeth) operate like one set. Thus, even if there is an overlap between the adjacent S-pole and N-pole magnets in the single rotor facing the leading end of the core (teeth), an effective magnetic flux path is set to increase the effective area of the magnet and to increase efficiency.

According to the present invention, the winding direction and the driving signal of the three-phase driving circuit are switched so that the adjacent split cores (teeth) generate magnetic flux in opposite directions. Accordingly, attractive force and repulsive force are simultaneously generated in the same direction with respect to the rotor set to have opposite polarities, and thus rotation driving of the single rotor may be effectively carried out.

In addition, the present invention is useful to provide a hub-type electric driving device capable of reducing resistance and coil loss by minimizing the resistance of coils by a parallel connection between respective core groups when the coils are wound by a three-connection method, thereby reducing the coil temperature and increasing the efficiency, and capable of realizing high-speed RPM by securing the number of turns of thin wires in diameter in a two-connection method, while requiring instantaneous power.

The present invention may minimize the ratio between the slots of the stator and the poles of the rotor, thereby achieving low coding noise and an increase in efficiency.

BEST MODE

Figure 1A:
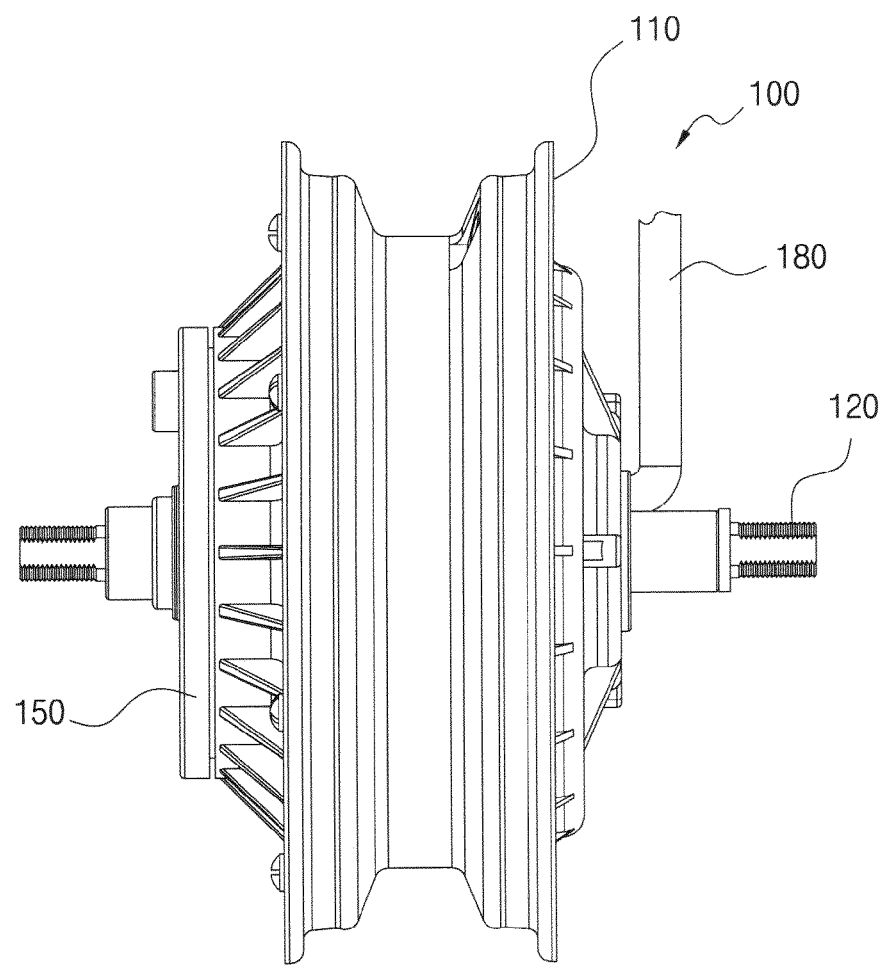
FIGS. 1A to 1C are front, right, and left side views, respectively, of a hub-type electric driving device according to the present invention.
Figure 1B:
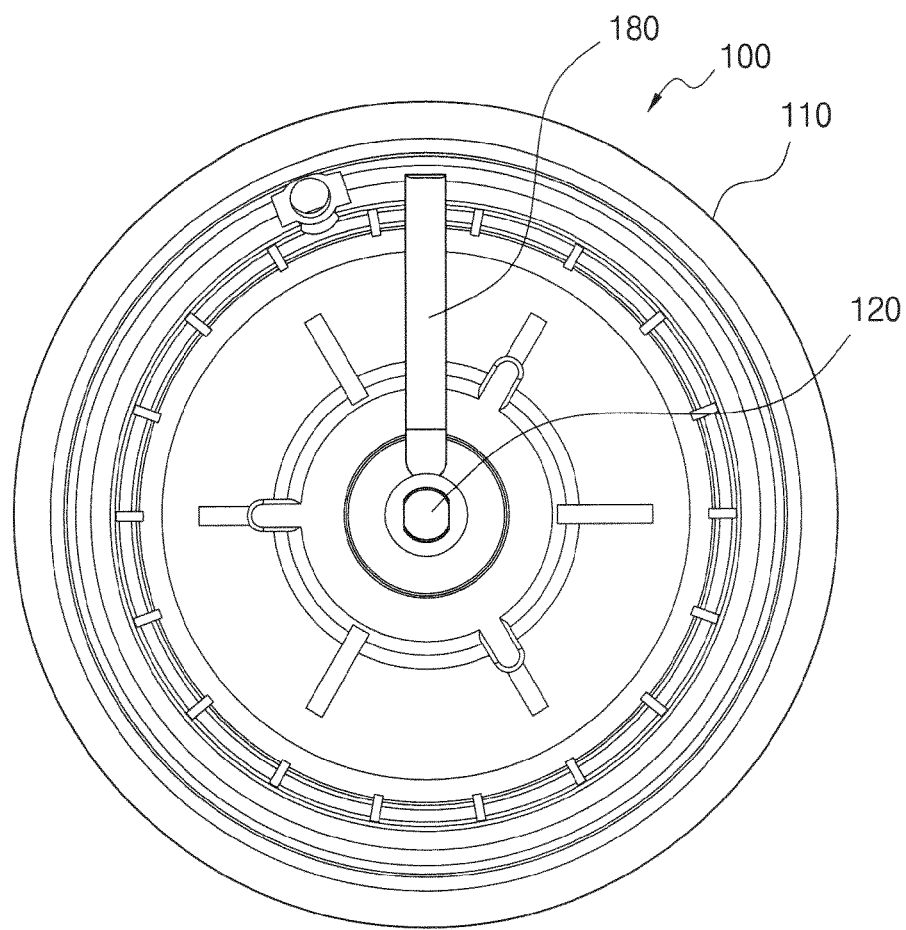
Figure 1C:
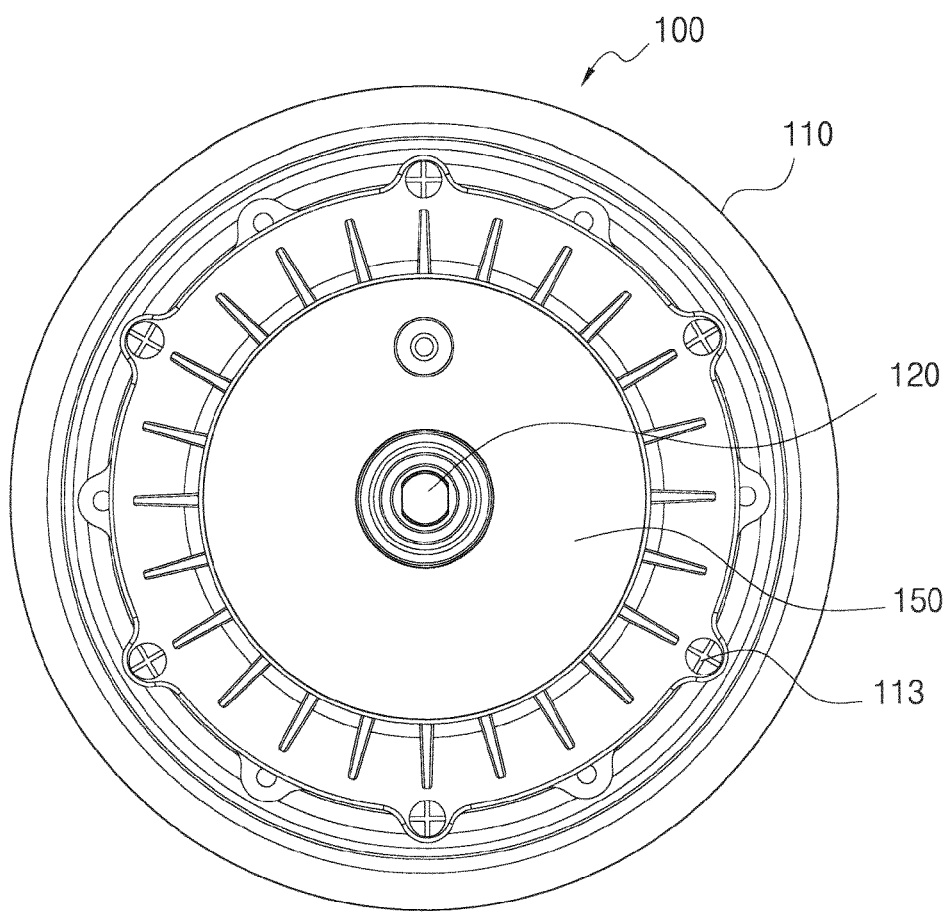

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A hub-type electric driving device according to the present invention is applied to a hub-type driving motor in which a motor is contained in a wheel which also serves as a motor casing for driving an electric bicycle, an electric vehicle, an electric motorcycle, an electric scooter, and an electric kickboard. In the following description, the target to which the driving device is applied is defined as a "body".

When the hub-type electric driving device according to the present invention is applied to one of an electric bicycle, an electric motorcycle, an electric scooter, and an electric kickboard, each having a body of two wheels, an installation position of the hub-type electric driving device is determined depending on whether the body employs a front wheel driving system or a rear wheel driving system. When the body is an electric vehicle or electric cart having four wheels, the hub-type electric driving device is applied to each of both the rear wheels in the case of a rear wheel drive, and the hub-type electric driving device is applied to each of all four wheels in the case of a four-wheel drive.

Referring to FIGS. 1A to 4, the hub-type electric driving device 100 according to the present invention largely includes a housing 110, a motor shaft 120, a rotor 130, a stator 140, a brake device 150, first and second bearings 161 and 162, a Hall sensor assembly 170, a cable 180, and a cable guide assembly 190.

In the hub-type electric driving device 100 according to the present invention, both ends of the motor shaft 120 are fixed to the body without rotating the motor shaft 120, and the rotor 130 and the housing 110 of a BLDC motor 200 contained in the housing 110 are rotated according to the rotation magnetic field of the stator 140 fixed to the motor shaft 120.

Hereinafter, the structure of the hub-type electric driving device 100 according to the present invention will be described in detail.

The housing 110 includes: a cup-shaped wheel 111 having one side which is opened in which a rim 111a to which a tire 101 is coupled is formed on an outer circumferential portion of the housing 100; and a cover 112 having an outer circumferential portion which is sealingly coupled to the opening of the wheel 111.

An O-ring 114 for sealing coupling is inserted between the opening of the wheel 110 and the outer circumferential portion of the cover 112, and is fastened and fixed with a plurality of fixing bolts 113 to maintain the assembled state of the wheel 110 and the cover 112.

Through-holes are formed at the centers of the wheel 110 and the cover 112, and first and second bearing housings 111b and 112a are formed at the outer circumferences of the through-holes, respectively, and first and second bearings 161 and 162 are installed in the first and second bearing housings 111b and 112a to rotatably support the housing 110 around the motor shaft 120.

An O-ring 189 for sealing is inserted between the second bearing 162 and the motor shaft 120.

The motor shaft 120 includes: first and second body coupling portions 121 and 126 having screw threads at both ends to be screw-coupled to the frame of the body; a cable guide bracket coupling portion 122 to which a cable guide bracket 191 is coupled; a stator coupling portion 123 coupled to the stator 140 at the middle part; and a brake body coupling portion 125 to which a brake body 151 is coupled.

A plurality of stepped portions that increase or decrease in diameter are formed between the first body coupling portion 121, the cable guide bracket coupling portion 122, the stator coupling portion 123, the brake body coupling portion 125, and the second body coupling portion 126, and the stepped portions serve to define an installation position of each portion.

A circular groove 112a is formed outside the cover 112, and a brake device 150 for braking the rotation of the housing is installed in the groove 112a. The brake device 150 includes: a brake ring 152 installed in the groove 112a; a brake pad 153 which is contracted and extended inside the brake device 150 according to the brake operation to allow the outer circumferential portion thereof to be compressed on the inner circumferential surface of the brake ring 152; and a brake body 151 which is coupled to the inlet of the groove 112a to block the inlet. The central portion of the brake body 151 is fixedly coupled to the motor shaft 120.

The hub-type electric driving device 100 according to the present invention includes a three-phase driving type BLDC motor 200 including the single rotor 130 and the single stator 140 inside the housing 110.

A back yoke 131 and a magnet 132 are stacked on a cylindrical wall of the cup-shaped wheel 110, to form the rotor 130. The magnet 132 may include a plurality of split magnets in which an N pole and an S pole are alternately arranged, or may employ a plurality of split-magnetized cylindrical magnets.

An annular sensing magnet 172 having have a magnetic pole corresponding to the rotor magnet 132 is installed on the bottom of the cup-shaped wheel 110. A Hall sensor assembly 170 in which a Hall sensor is mounted on a PCB is installed at a portion facing the sensing magnet 172 in a stator 140 to be described later so as to sense a rotation position of the rotor when the rotor is rotated.

The stator 140 is arranged with an air gap opposite to the magnet 132 of the rotor 130, and the central portion of the stator 140 is coupled and fixed to the outer circumference of the motor shaft 120 in a key coupling method using a key 124, and the rotor 130 is rotated by applying a rotating magnetic field to the rotor 130.

The stator 140 according to a first embodiment of the present invention has a structure in which, for example, three-phase (U, V, W) coils 143 are wound on an insulating bobbin 142 formed by assembling or insert molding a plurality of teeth (i.e., the coil winding portion) 141b into the teeth of an integrated stator core 141 radially extended from the yoke (body) 141a of a ring form. The bobbin 142 integrally formed on the surface of the teeth 141b may be formed by an insert molding method using a thermosetting resin or a thermoplastic resin together with a stator support 145.

The stator 140 is configured so that three wires carrying three-phase (U, V, W) drive signals required to drive the motor from the outside of the housing 110 are incorporated into one cable 180 and introduced into the housing 110, fixed to three bus bars installed on the stator support 145 of the stator 140, and then connected to three-phase (U, V, W) coils 143 wound around a plurality of teeth 141b, respectively.

In this case, the hub-type electric driving device 100 according to the present invention may be configured in a split-core manner in which three-phase (U, V, W) coils 143 are wound by using a plurality of split cores instead of the integral stator core 141, and the stator supports 145 are simultaneously formed while being integrated into an annular shape using a molding resin.

Figure 2:
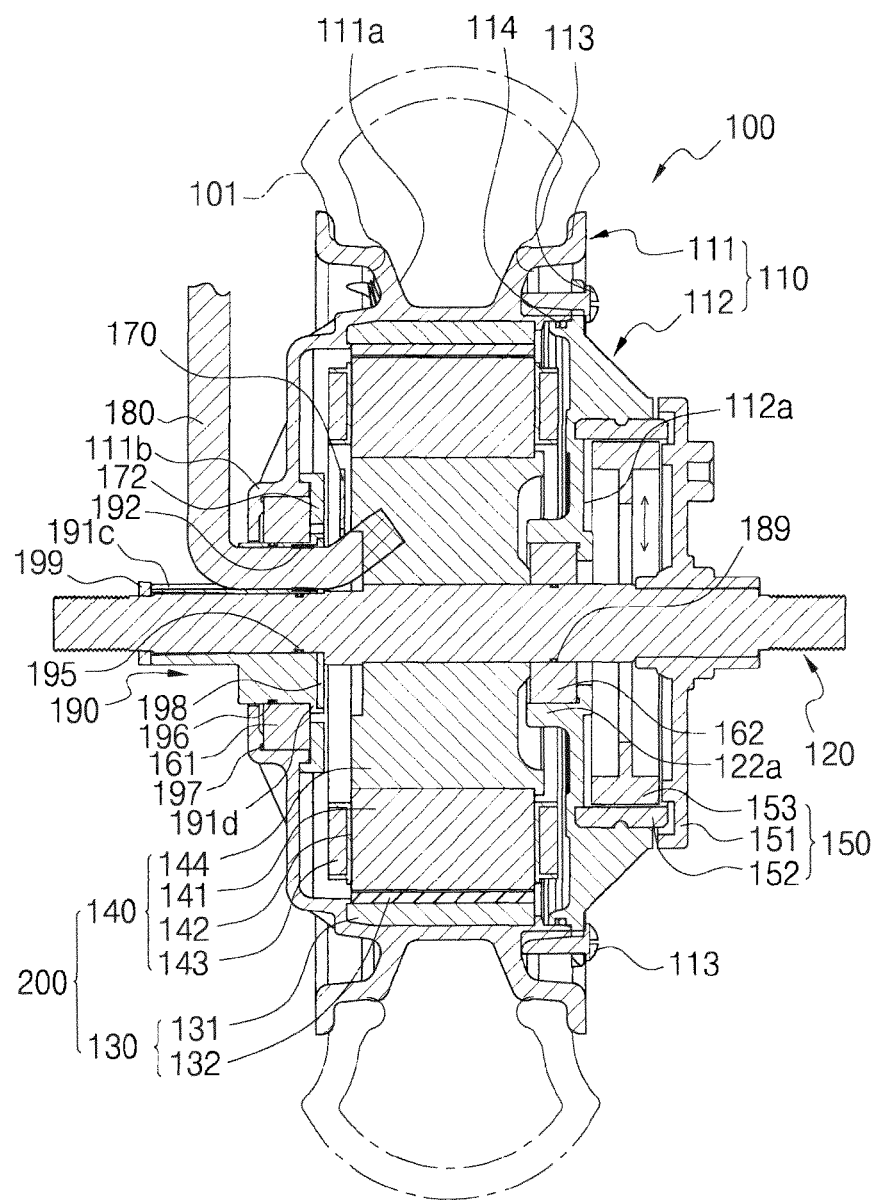
FIG. 2 is a cross-sectional view taken along the line A-A in FIG. 1C.

As illustrated in FIG. 2, the stator 140 may be integrated by forming the stator support 145 by molding the stator core 141 and the stator frame 144 with a thermosetting resin, for example, a bulk molding compound (BMC) molding material such as polyester or a thermoplastic resin, in a state where the stator core 141 and the stator frame 144 are arranged in an axial direction from the outside to the inside. In this case, the bobbin 142 defining an area where the coil 143 is wound is integrally formed on the teeth 141b of the stator core 141 except for a portion facing the magnet 132 of the rotor.

Figure 5A:
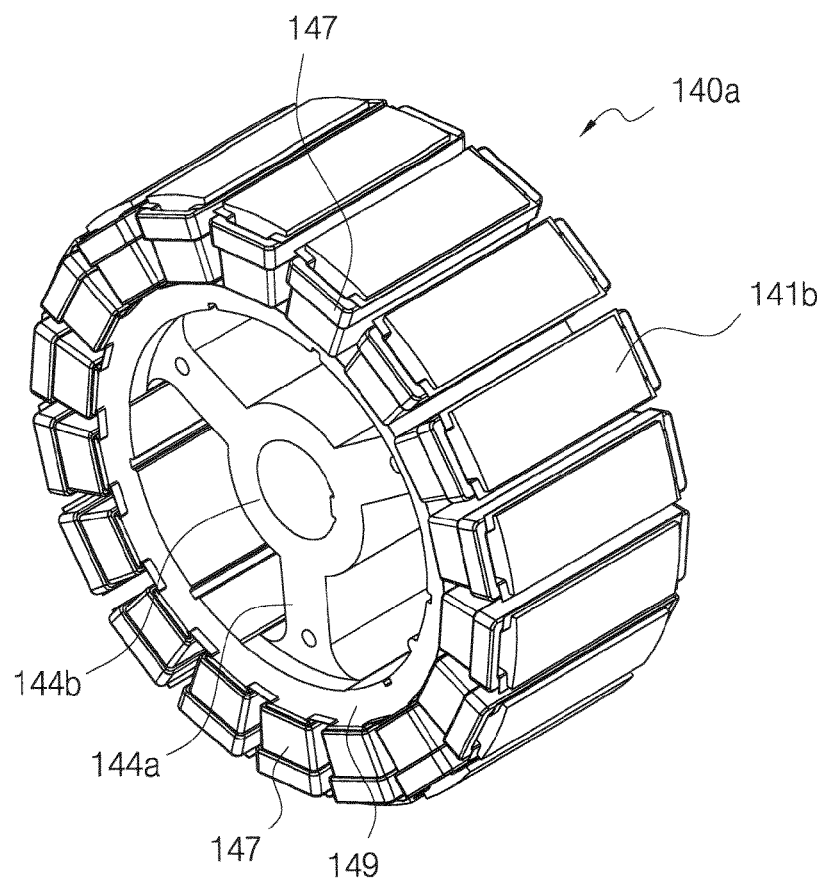
FIGS. 5A to 5D are a perspective view, an exploded perspective view, a diameter direction cross-sectional view, and an enlarged plan view of a first insulator, respectively showing a stator according to a second embodiment of the present invention.
Figure 5B:
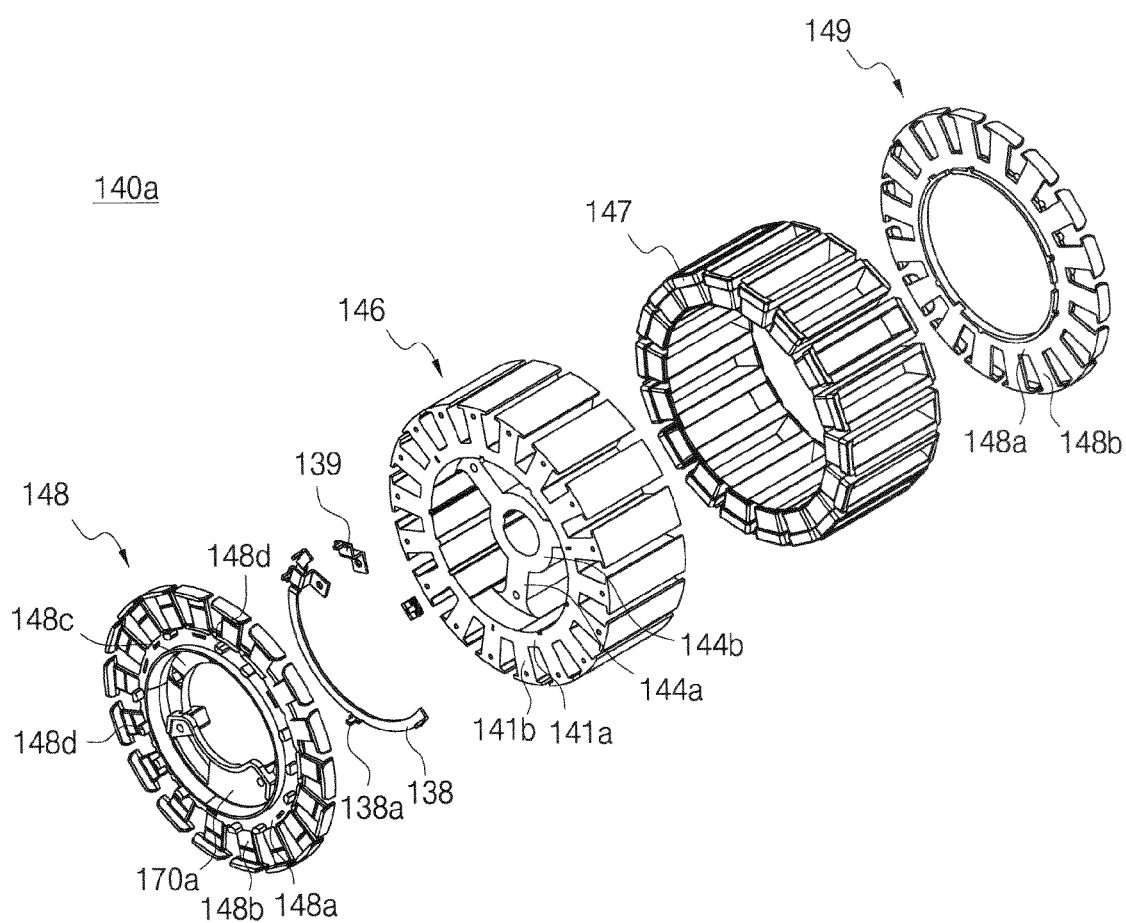
Figure 5C:
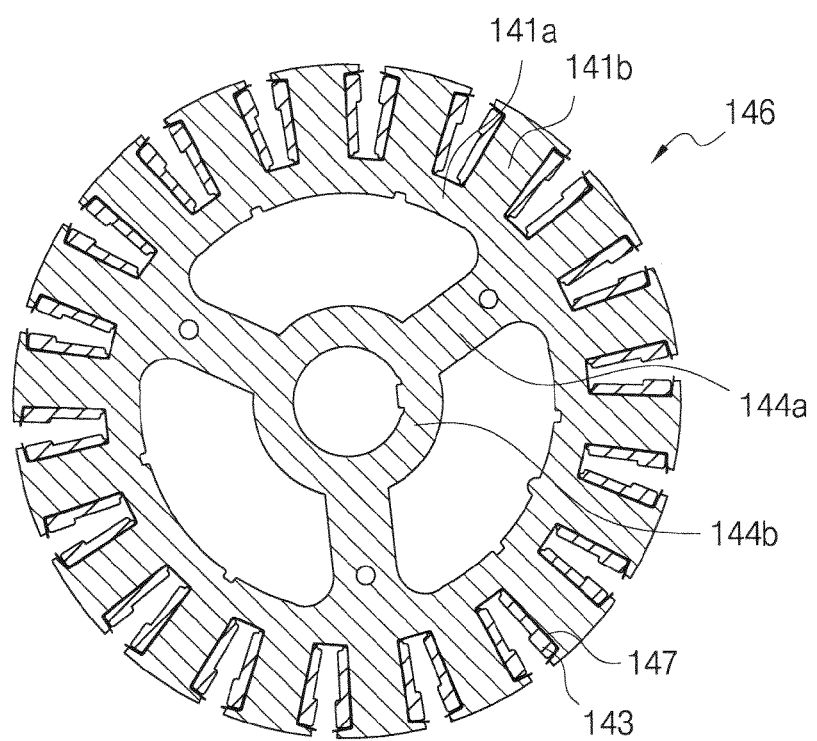

In addition, the stator 140 may be assembled by being fitted and coupled with the stator frame 144 while integrally forming the bobbin 142 and the stator support 145 in the stator core 141 and winding the three-phase (U, V, W) coils 143 on the teeth 141b. In this case, the stator frame 144 may be made of a metal material and may have a structure in which an outer ring and an inner ring (boss) 144b are connected by a plurality of connection portions 144a. That is, the stator frame 144 may have a shape in which a plurality of teeth 141b are removed from the integrated core frame 146 illustrated in FIG. 5B. The stator frame (144) may be manufactured by, for example, a die casting method using an aluminum alloy, or may be molded by a powder metallurgy method using a tungsten material.

Meanwhile, the stator 140 according to the present invention may be formed by forming an insulating bobbin and a stator support on a plurality of teeth 141b in an assembly method and winding the three-phase (U, V, W) coils 143 thereon.

A stator 140a in accordance with the second embodiment of this invention includes an integrated core frame 146, insulating films 147, first and second insulators 148 and 149, and coils 143. The insulating film 147 and the first and second insulators 148 and 149 perform the same function as the insulating bobbin and the stator support of the stator according to the first embodiment.

As illustrated in FIGS. 5A to 5D, the stator 140a according to the second embodiment may employ the integrated core frame 146 in which the stator core 141 and the stator frame 144 are integrated, and may be formed by stacking a plurality of thin-film silicon steel plates. The integrated core frame 146 may have a structure in which the plurality of teeth 141b radially extend around an outer circumference of the annular yoke 141a and the inner ring (boss) 144b coupled to the motor shaft 120 are connected to an inner side of the annular yoke 141a through the plurality of connection parts 144a.

The plurality of teeth 141b radially extending from the integrated core frame 146 are provided with a thin insulating film 147 formed in a substantially rectangular cylindrical shape to surround four sides except the outer circumferential surface facing the magnet of the rotor, and maintains an insulating state when the coils 143 are wound on the teeth 141b.

In addition, the stator 140a is assembled in such a manner that the first and second insulators 148 and 149 are fitted into the integrated core frame 146 such that the plurality of teeth 141b and the annular yoke 141a of the integrated core frame 146 are covered on one side and the other side. When the coils 143 are wound on the teeth 141b, the first and second insulators 148 and 149 maintain an insulating state together with the insulating film 147.

Each of the first and second insulators 148 and 149 includes an annular body 148a and a plurality of extension protrusions 148b radially extending from the annular body 148*a* to correspond to the plurality of teeth 141*b* and the annular yoke 141*a*, respectively.

In addition, the first insulator 148 has an annular extension part 148*c* extending inward of the annular body 148*a*. In the annular extension part 148*c*, a Hall sensor fixing part 170*a* for fixing the PCB of the Hall sensor assembly 170 using a fixing bolt or a fixing screw 171 is provided, and three bus bar fixing nuts 139 for fixing a bolt for a bus bar are embedded at intervals.

Furthermore, when the three-phase (U, V, W) coils 143 are connected in a star-connection (that is, a Y-connection) manner, a common terminal 138 for forming a neutral point is insert-molded in the first insulator 148, and thus three common terminal ends 138*a* may protrude above the first insulator 148.

The annular body 148*a* of the first insulator 148 may include a plurality of winding guide protrusions 148*d* serving as guides when moving to another tooth or changing a winding direction while maintaining tension to wind a coil around one tooth 141*b* and then wind the coil around another tooth, as necessary.

In addition, U-phase, W-phase, and V-phase terminal ends (UT, WT, VT) to which the three-phase (U, V, W) outputs of the inverter circuit 50 (see FIG. 7) are connected are arranged at intervals in the annular body 148*a* of the first insulator 148.

The U-phase, W-phase and V-phase terminal ends (UT, WT, VT) are respectively connected internally to one of the three bus bar fixing nuts 139 in the first insulator 148. A bus bar bolt is coupled to each of the three bus bar fixing nuts 139. Accordingly, the three-phase (U, V, W) outputs of the inverter circuit 50 are introduced from the outside of the housing 110 to the inside through the cable 180 and then are connected to the three bus bar bolts so as to be stably connected to the U-phase, W-phase, and V-phase terminal ends (UT, WT, VT).

Figure 3:
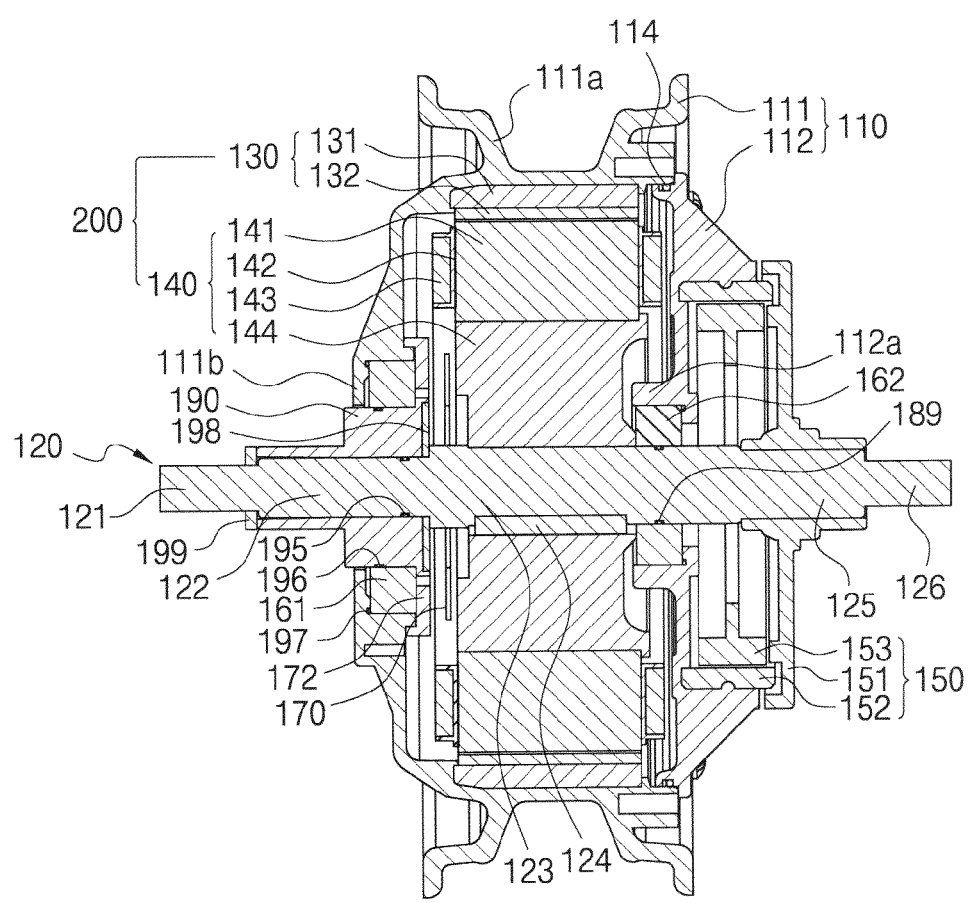
FIG. 3 is a cross-sectional view taken along the line B-B in FIG. 1C.
Figure 4:
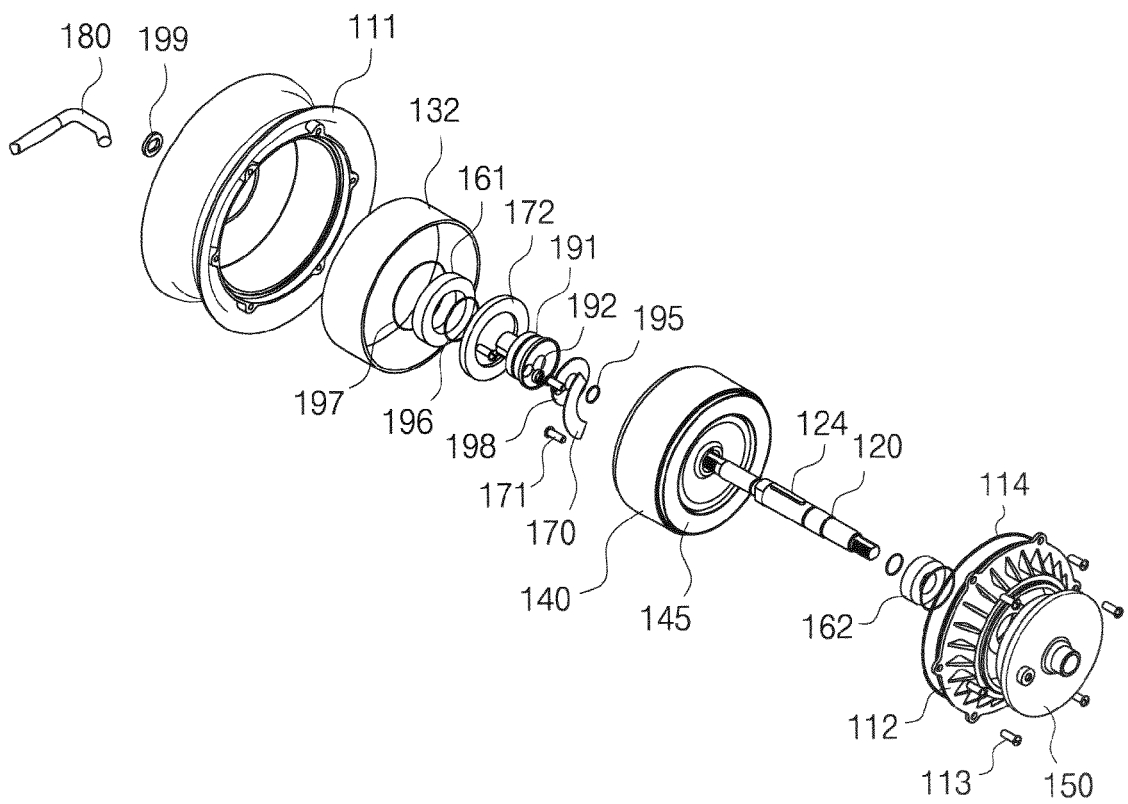
FIG. 4 is an exploded perspective view of a hub-type electric driving device according to the present invention.

In the stator frame 144 or the integrated core frame 146 separated from the stator core 141, the inner ring (boss) 144*b* may be fixed to the motor shaft 120 using a key 124 as illustrated in FIG. 3, and the stator frame 144 and the integrated core frame 146 may be fixedly coupled to the motor shaft 120 in a spline coupling manner.

As a result, the coupling between the stator 140 and the motor shaft 120 is not biased in the circumferential direction or the axial direction and has a stable support structure, and thus since the motor casing (wheel) is not biased even when rotating, no partial wear may be generated, durability may be improved, and noise generation may be suppressed.

The hub-type electric driving device 100 according to an exemplary embodiment of the present invention may include a BLDC motor 200 including a 20-pole single rotor 130 and a single stator 140 having an 18-slot structure. In the stator 140, three-phase (U, V, W) coils 143 are wound around the teeth 141*b* of the stator core 141. From the motor drive device installed outside the housing 110 to the three-phase (U, V, W) coils 143, a driving signal is transmitted through a cable 180 in a 6-step manner.

When the BLDC motor 200 is driven in a three-phase (U, V, W) driving system, for example, the rotation position of the rotor 130 may be sensed using a Hall sensor as a rotor position detection element. To this end, a sensing magnet 172 rotating simultaneously with the rotor 130 is installed on the bottom of the wheel 110. When the rotor 130 is rotated, the rotation position of the rotor 130 may be sensed by a Hall sensor assembly 170 installed in the stator 140 facing the sensing magnet 172.

The rotor position detection element detecting the position signal of the rotor may use, for example, two or three Hall elements, in the three-phase driving system. The Hall sensor assembly 170 may have a structure in which three Hall sensors and peripheral circuit elements are mounted on a printed circuit board (PCB).

Hereinafter, a 3-connection method of three-phase coils in a single rotor type BLDC motor according to the present invention will be described with reference to FIGS. 6A to 6D.

Figure 6A:
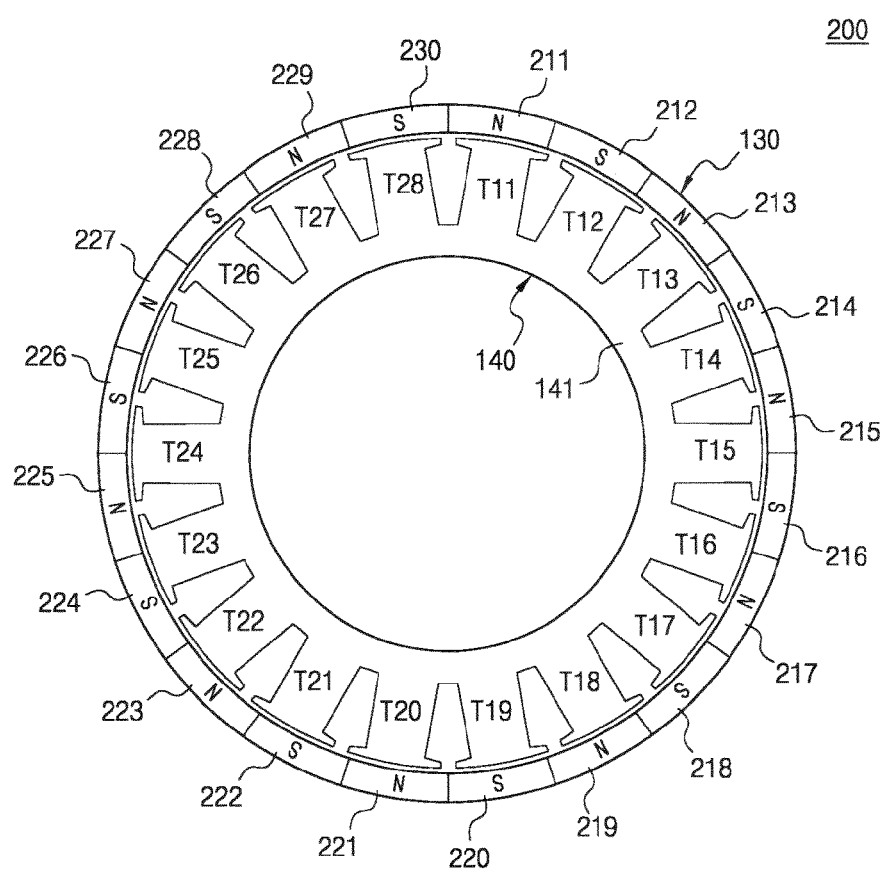
FIGS. 6A to 6D are, in a single rotor type BLDC motor according to the present invention, a plan view showing a state in which a stator core and the magnet of a rotor face each other, an explanatory diagram, which explains a method of winding three-phase coils on a stator core in a three-connection method, an equivalent circuit diagram of three-phase coils wound according to the winding method of FIG. 6B, and an explanatory diagram illustrating a coil connection diagram in which three-phase coils are wound on the stator core illustrated in FIG. 6A in the three-connection method.

FIG. 6A illustrates a state in which the stator core and the magnet of the rotor face each other in the single rotor type BLDC motor according to the present invention. The stator core shows the stator 140 according to the first embodiment of the present invention configured by assembling the stator core 141 and the stator frame 144. However, The stator core may be applied to the stator 140*a* according to the second embodiment using the integrated core frame 146 in which the stator core 141 and the stator frame 144 are integrated.

The single rotor type BLDC motor according to the present invention is, for example, an 18-slot 20-pole type motor, and includes the stator 140 and the rotor 130 arranged at intervals outside the stator 140. In the description of the embodiment shown in FIG. 6A, an outer rotor type motor in which the rotor is arranged outside the stator has been described as an example. However, on the contrary, the present invention may also be applied to an inner rotor type motor in which the rotor is arranged inside the stator.

The rotor 130 may be implemented in a structure in which magnets (i.e., poles) 211-230 having a plurality of different polarities (N-poles and S-poles) are attached to a back yoke (not shown) in an annular shape.

As shown in FIG. 6A, the stator core 141 may be implemented as an integrated stator core in which a plurality of or eighteen teeth T11-T28 each having a T-shaped leading end portion are radially extended from the annular back yoke, or may be implemented as a plurality of or eighteen split cores each having a T-shaped leading end portion and a rear end portion interconnected to form an annular back yoke.

In the present invention, the stator core 141, in which the coil is wound around the stator 140 and forming a magnetic circuit path may be used as an integrated core or split cores as described above.

Therefore, for convenience of description, the teeth, the split cores, or the slots formed between one tooth and another tooth are used in the same meaning except for special cases, and the same member numbers T11-T28 are assigned thereto.

The number of magnets (poles) and the number of teeth (slots) implementing the rotor 130 included in the single rotor type BLDC motor may have various combinations of the numbers of magnets and teeth in addition to 18 slots and 20 poles.

Hereinafter, in an embodiment of the present invention, for convenience of description, a BLDC motor implemented with 18 slots and 20 poles illustrated in FIG. 6A will be described as an example.

The BLDC motor employing the 18-slot and 20-pole manner in accordance with this invention includes: the stator 140 provided with the stator core 141 in which eighteen teeth T11-T28 are arranged in an annular form and coils U1-U6, V1-V6, and W1-W6 are wound around the eighteen teeth T11-T28; and the rotor 130 in which N-pole and S-pole magnets are alternately arranged in an annular form outside the stator 140.

Hereinafter, a method of designing a motor (hereinafter, referred to as a three-connection structure motor) in which coils are alternately wound around three teeth adjacent to each other according to the present invention will be described.

First, when designing the three-connection structure motor according to the present invention, the slots of the stator and the magnets (poles) of the rotor are set to, for example, a ratio of 18 slots to 20 poles. Accordingly, in the present invention, the ratio of the number of slots to the number of poles varies by about 10%. As a result, the cogging that occurs when the rotor is rotated is greatly reduced compared to the one-connection manner. The gap between one core and another core (i.e., one slot and another slot) is set to be narrow. As a result, the opposite effective area between the magnet and the core (i.e., the teeth) increases, thereby increasing efficiency.

In the rotor 130, N-pole magnets 211, 213, 215, 217, 219, 221, 223, 225, 227, and 229 and S-pole magnets 212, 214, 216, 218, 220, 222, 224, 226, 228, and 230 are alternately arranged, and an annular back yoke (arrow parts) is provided on the outer circumference to form a magnetic circuit path between adjacent magnets, but has been omitted for convenience of explanation.

Referring to FIGS. 6A through 6D, a connection structure of the three-phase coils of the stator and a method of winding three-phase coils around the stator core in the three-connection manner according to the present invention will be described.

When the stator 140 of the present invention has an 18-slot 20-pole structure, the three-phase (U, V, W) coils 143 include six coils (U1-U6, W1-W6, and V1-V6) for each of the U, V, and W phases. The coils (U1-U6, W1-W6, V1-V6) for each of the U, V, and W phases are wound continuously on three adjacent teeth to form a core group. Overall, six, that is, first to sixth core groups G1 to G6 are formed.

If the state has 27 slots, which is a multiple of 9, nine coils (U1-U9, V1-V9, W1-W9) are included in each phase, and are continuously wound on the adjacent three teeth, to form nine core groups G1 to G9.

Figure 6B:
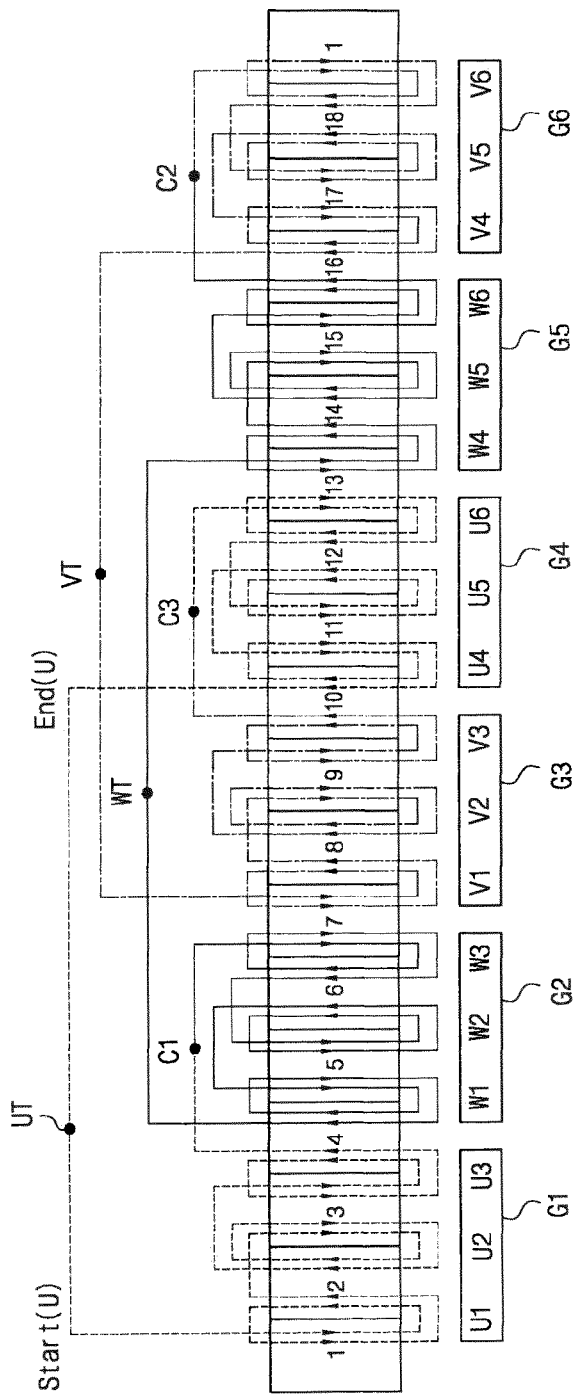
Figure 6C:
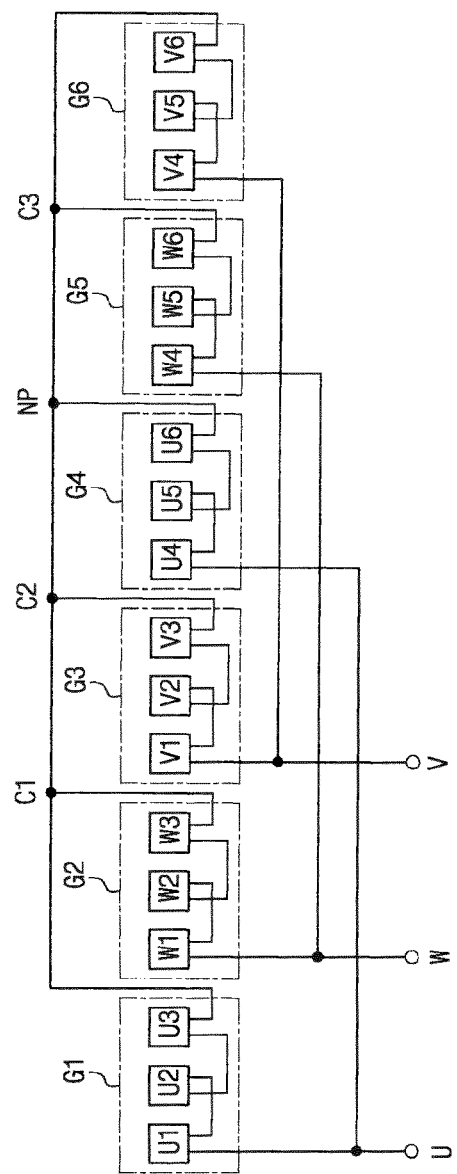
Figure 6D:
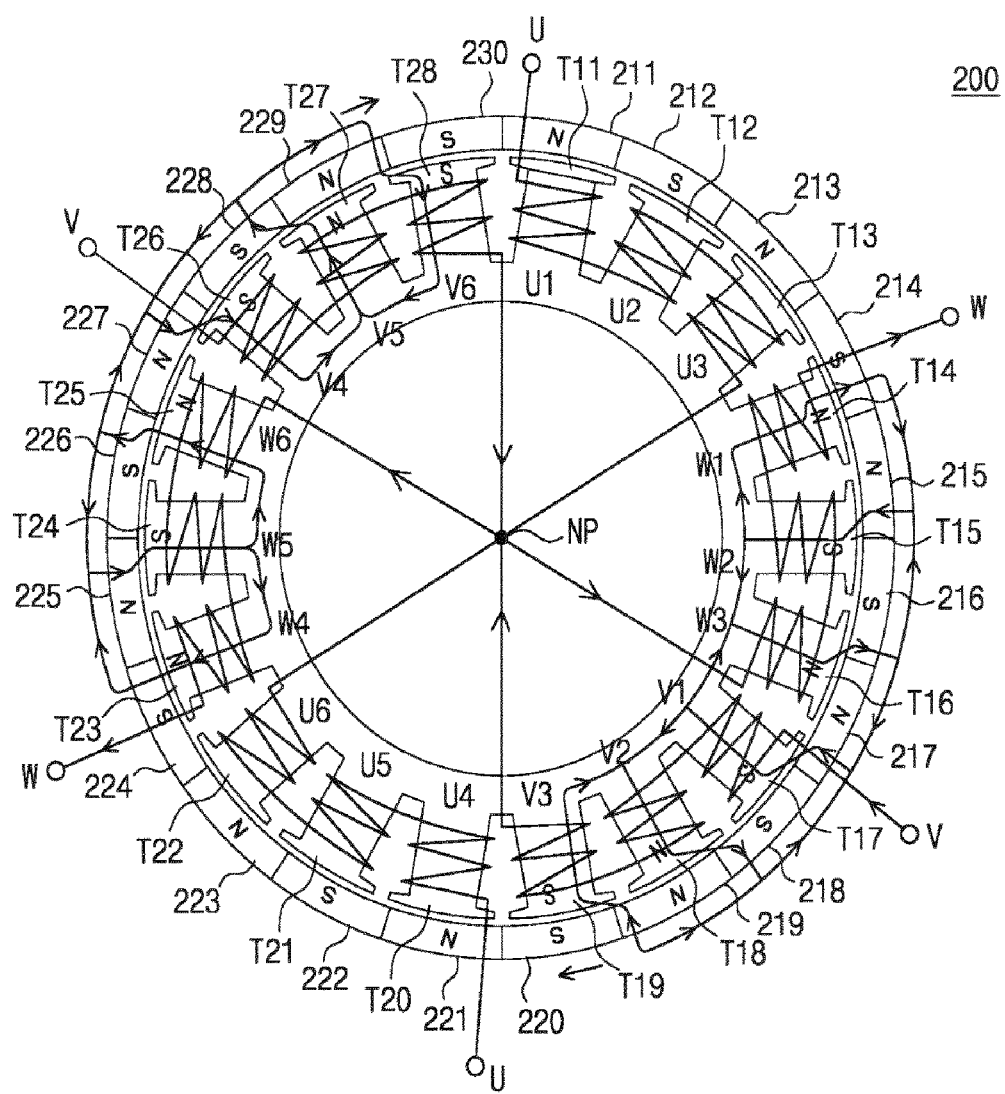

As shown in FIGS. 6C and 6D, each of the core groups G1 to G6 is continuously and sequentially wound on three of the 18 teeth T11-T28 and is annularly arranged in the stator core 141. As a result, the first core group G1 and the fourth core group G4 on the U-phase, the second core group G2 and the fifth core group G5 on the W-phase, and the third core group G3 and the sixth core group G6 on the V-phase are arranged at mutually opposite positions with respect to the center of the stator core 141.

Figure 7:
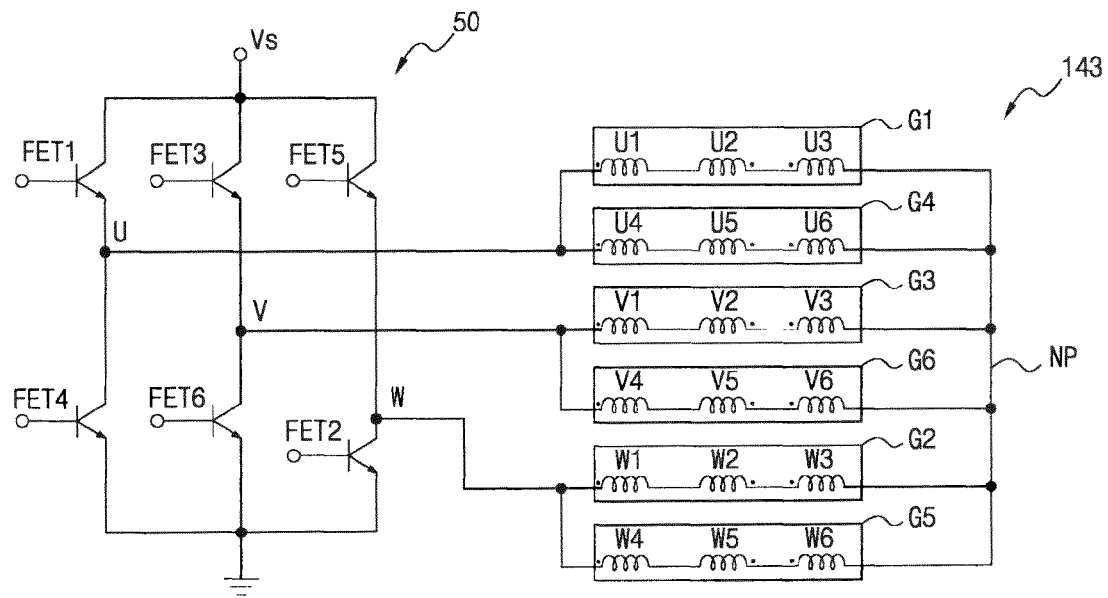
FIG. 7 is a circuit diagram illustrating a coil connection diagram of three-phase coils illustrated in FIG. 6D and a motor driving circuit together.
Figure 8A:
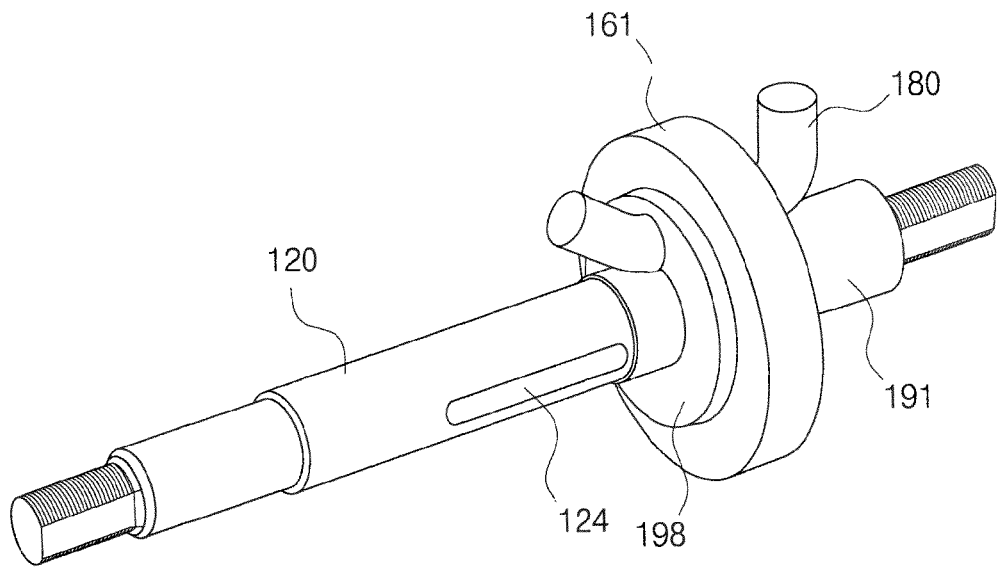
FIGS. 8A to 8D are a front perspective view, a rear perspective view, a partial cut cross-sectional view, and a partial cut cross-sectional view showing a cable removal state, respectively for illustrating a cable introduction structure in a hub-type electric driving device according to the present invention.
Figure 8B:
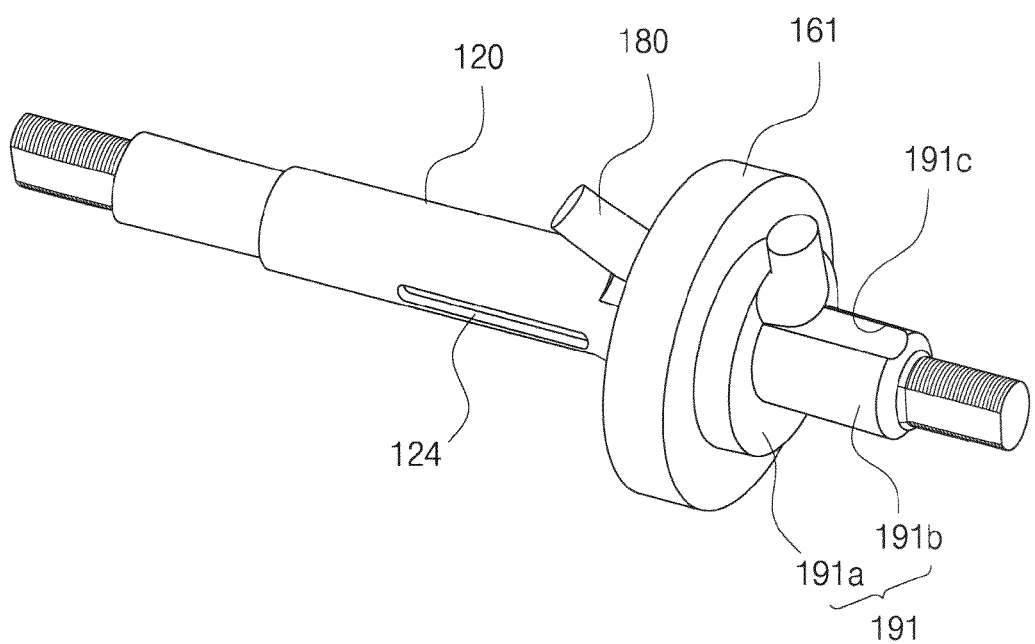
Figure 8C:
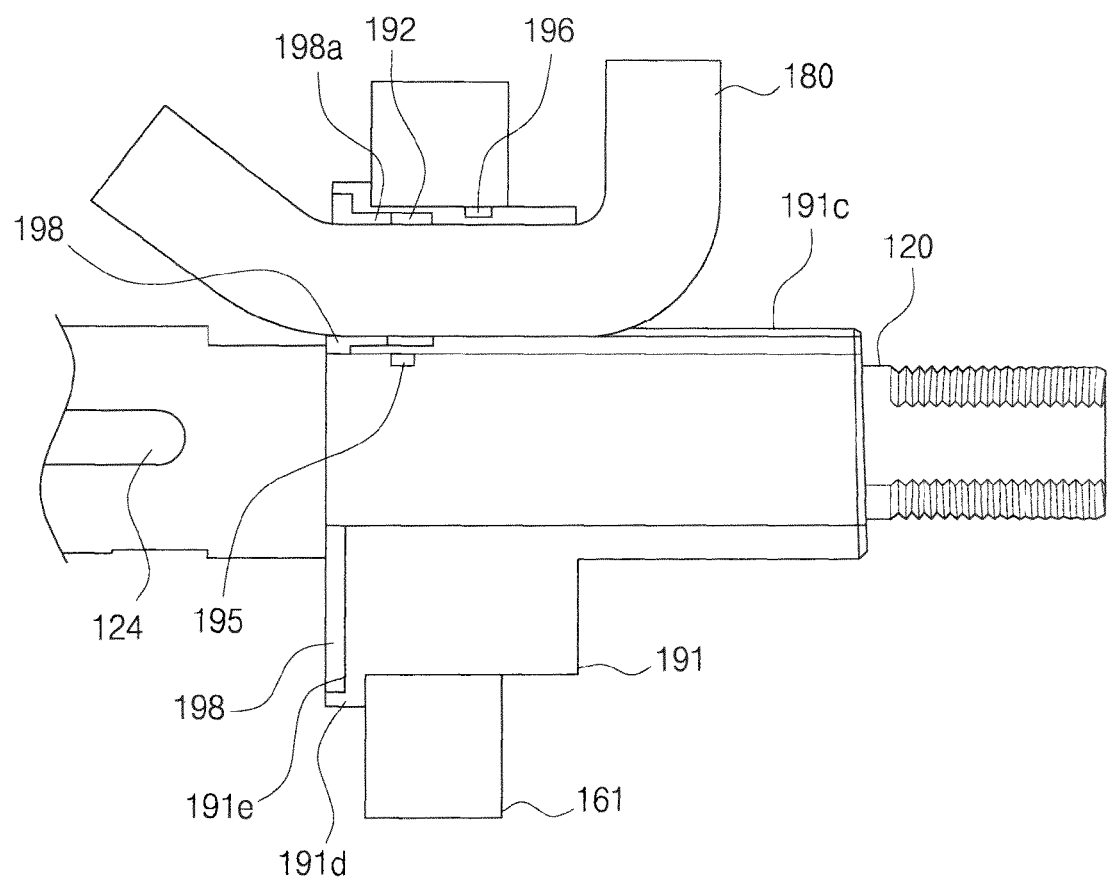
Figure 8D:
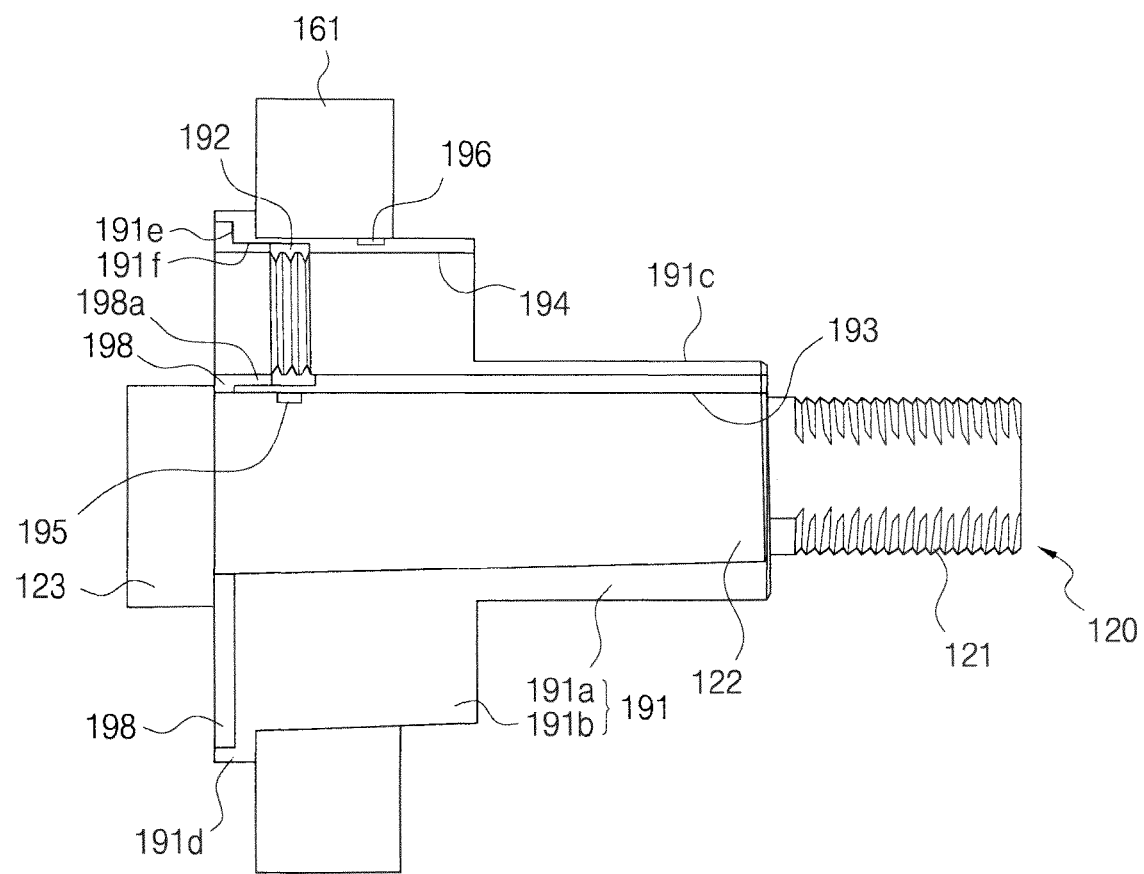

Further, in the stator 140 of the present invention, the three-phase (U, V, W) coils (U1-U6, W1-W6, and V1-V6) are connected in a Y-connection manner. As shown in FIG. 7, in the coils U1-U6, W1-W6, and V1-V6 of each phase, one side (start terminal) of each phase is connected to the U, V, or W output of an inverter circuit 50 constituting the motor driving circuit, and the other side (end terminal) of each phase is connected to each other to form a neutral point (NP).

In this case, when the three-phase (U, V, W) coils (U1-U6, W1-W6, and V1-V6) are connected in a Y-connection manner, the common terminal 138 for forming the neutral point NP is insert-molded in the first insulator 148, and three common terminal ends 138a protrude from the common terminal 138 to an upper part of the first insulator 148, and the other side (end terminal) of each phase is connected to the three common terminal ends 138a.

In addition, when six core groups G1 to G6 continuously wound to three adjacent teeth are, for example, coils U1-U3 of the U-phase core group G1, wires are wound on the teeth T11-T13 in the order of forward, reverse, and forward directions, and each tooth in each core group generates a magnetic flux in the mutually opposite directions.

In addition, when viewing the stator 140 as a whole, in the case of the eighteen teeth T11-T28, as will be described later, the selective driving signals are generated from the control unit (not shown) of the motor driving circuit and applied to the three-phase coils U1-U6, W1-W6, and V1-V6 through the inverter circuit 50, so that magnetic fluxes are generated in opposite directions between adjacent teeth.

The coils U1-U6, W1-W6, and V1-V6 of respective phases U, V, and W have two core groups connected in parallel, and the inputs of each core group are commonly connected to the U, V, and W outputs of the inverter circuit 50. The outputs of each core group are commonly connected to the three common terminal ends (C1-C3) 138a to form a neutral point NP.

That is, in the U-phase coils U1-U6, the inputs and outputs of the first core group G1 consisting of three coils U1-U3 and the inputs and outputs of the fourth core group G4 consisting of three coils U4-U6 are commonly connected, respectively. In the W-phase coils W1-W6, the inputs and outputs of the second core group G2 consisting of three coils W1-W3 and the inputs and outputs of the fifth core group G5 consisting of three coils W4-W6 are commonly connected, respectively. In the V-phase coils V1-V6, the inputs and outputs of the three core group G3 consisting of three coils V1-V3 and the inputs and outputs of the sixth core group G6 consisting of three coils V4-V6 are commonly connected, respectively.

As illustrated in FIGS. 6C and 6D, in the stator 140 wound by a three-connection method according to this invention, the coils U1-U6, W1-W6, and V1-V6 of each phase (U, V, or W) are sequentially wound on the eighteen teeth T11-T28 and thus the first to sixth core groups G1 to G6 are sequentially arranged.

Hereinafter, a method of winding three-phase coils to a stator core according to the present invention by using a three-connection method will be described with reference to FIG. 6B.

In the present invention, as shown in FIG. 6B, by using a single wire, after winding the first core group G1 of the U phase on the teeth T11-T13, the second core group G2 of the W phase is wound on the teeth T16-T14. Then, after winding the fifth core group G5 of the W phase on the teeth T23-T25, the sixth core group G6 of the V phase is wound on the teeth T28-T26. Then, after winding the third core group G3 of the V phase on the teeth T17-T19, the fourth core group G4 of the U phase is wound on the teeth T22-T20.

As described above, in the present invention, the coil winding is completed with a single wire by sequentially performing coil winding from starting the winding of the first core group G1 of the U phase on the teeth T11 to ending the winding of the fourth core group G4 of the U phase on the teeth T20.

As a result, the present invention does not require any connection between the coils wound on six teeth in the same phase and between the coils wound on six teeth in the different phases.

In this case, the winding direction of the coils wound in the three teeth included in each core group G1-G6 is performed in the order of a forward direction, a reverse direction, and a forward direction. In addition, after winding the coils U1, U2, and U3 of the first core group G1 on the U phase, when winding the coils W3, W2, and W1 of the second core group G2 on the W phase, the winding is performed in the direction from the rear-side teeth T16 to the front-side teeth T14. Likewise, the coils are also wound in the same way in the fifth core group G5 of the W phase, the sixth core group G6 of the V phase, the third core group G3 of the V phase, and the fourth core group G4 of the U phase.

In addition, in the process of moving from the coil U3 of the first core group G1 on the U phase to the coil W3 of the second core group G2 on the W phase, a step of winding a coil on one of the three common terminal ends 138a (C1-C3) is performed one-time by a wire wrapping method. Accordingly, one end of the first core group G1 and one end of the second core group G2 are naturally connected to the neutral point NP.

In this case, the wire wound on the teeth to form the coil uses, for example, a polyurethane enameled wire (UEW) coated with polyurethane or a polyester enameled wire (PEW) coated with polyester, and thus when soldering is performed after wire wrapping is performed on the common terminal ends 138a (COM), an electrical connection between the wire and the common terminal ends 138a (COM) is easily made.

In the same manner, the coils between the fifth core group G5 on the W phase and the sixth core group G6 on the V phase, and the coils between the third core group G3 on the V phase and the fourth core group G4 on the U phase are also connected to the common terminal ends 138a (COM) between one core group and another core group so that one end of each core group is naturally connected to the neutral point NP.

In addition, the start terminal of the coil U1 of the first core group G1 on the U phase and the end terminal of the coil U4 of the fourth core group G4 on the U phase are commonly connected to the U-phase terminal end UT, and the U-phase output of the inverter circuit 50 is connected to the U-phase terminal end UT. Inputs of the first core group G1 and the fourth core group G4 on the U phase connected in parallel are commonly connected to the U-phase terminal end UT.

In the same manner, in the process of moving from the second core group G2 to the fifth core group G2 between the second core group G2 and the fifth core group G5 on the W phase, a step of winding a coil on a W-phase terminal end WT is performed one-time by a wire wrapping method. Accordingly, one end of the second core group G2 and one end of the fifth core group G5 are naturally connected to the W-phase terminal end WT.

In the same manner between the third core group G3 and the sixth core group G6 on the V phase, one end of the third core group G3 and one end of the sixth core group G6 are connected to the V-phase terminal end VT.

Figure 5D:
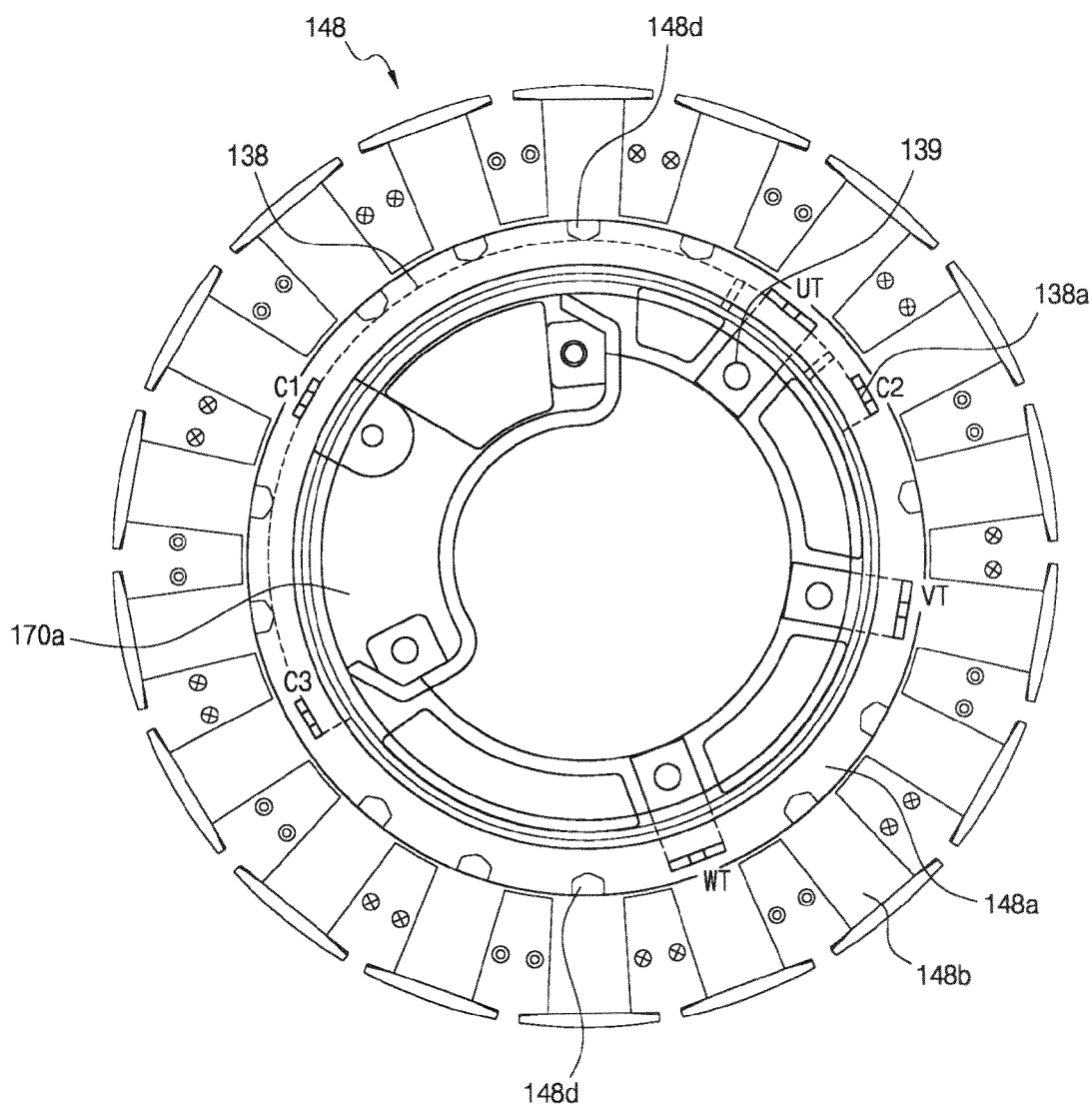

In this invention, as illustrated in FIG. 5D, the winding guide protrusions 148d, three common terminal ends 138a (C1-C3), and one of U-phase, W-phase, and V-phase terminal ends UT, WT, and VT are arranged for all eighteen teeth on the annular body 148a of the first insulator 148. In this case, the three common terminal ends 138a (C1-C3) are arranged between the first core group G1 on the U phase and the second core group G2 on the W phase, which are adjacent to each other, between the fifth core group G5 on the W phase and the sixth core group G6 on the V phase, which are adjacent to each other, and between the third core group G3 on the V phase and the fourth core group G4 on the U phase, which are adjacent to each other, and the U-phase, W-phase, and V-phase terminal ends UT, WT, and VT are preferably arranged between the first core group G1 on the U phase and the fourth core group G4 on the same phase, between the second core group G2 on the W phase and the fifth core group G5 on the same phase, and between the third core group G3 on the V phase and the sixth core group G6 on the same phase.

The plurality of winding guide protrusions 148d may be used to serve as a guide when moving to another teeth or changing a winding direction while maintaining tension to wind a coil on the teeth 141b of one core group after winding the coil on the teeth 141b of another core group.

In the present invention, when the three-phase coils are wound on the teeth of the integrated stator core by a three-connection method, all coil windings are continuous at once, and thus the coil winding may be performed without a connection point.

However, the coil winding method of the present invention is not limited thereto, and may be divided and wound. Winding is performed every two adjacent core groups, for example, winding is performed on six adjacent teeth in a continuous winding method. Thus, winding may be performed every two-split core groups G1 and G2, G3 and G4, and G5 and G6, and may be performed three times.

As described above, as shown in FIG. 7, in the BLDC motor 200 according to the present invention, the input and the output of the first core group G1 on the U phase and the input and the output of the fourth core group G4 on the U phase are commonly connected to each other. The input and the output of the second core group G2 on the W phase and the input and the output of the fifth core group G5 on the W phase are commonly connected to each other. The input and the output of the third core group G3 on the V phase and the input and the output of the sixth core group G6 on the V phase are commonly connected to each other. As the core groups have a parallel connection structure, the resistance of the stator coil 143 may be minimized.

In addition, in the present invention, when the three-phase coils U1-U6, W1-W6, and V1-V6 are wound on the teeth T11-T28 of the stator core, the winding may be performed using two strands of thin wires. In this case, since the input and output of each core group G1-G6 are commonly connected to the U-phase, W-phase, and V-phase terminal ends UT, WT, and VT and the common terminal ends C1-C3, resistance of the stator coil 143 may be minimized by configuring a parallel circuit.

In general, the resistance R is proportional to the length l and inversely proportional to the cross-sectional area S. Accordingly, the total resistance of the stator coil 143 having parallel connection between the respective core groups is reduced by about ½ compared to the serial connection structure. As a result, copper loss (coil loss) is a phenomenon caused by the generation of energy of ($P=I^2R$) as heat when current I flows through a conductor of resistance RΩ, and energy loss causes a temperature rise.

As a result, in the present invention, as the resistance of the stator coil 143 decreases, resistance and coil loss may be reduced to lower the coil temperature and increase efficiency. Also, since the resistance of the stator coil 143 may be lowered, a power rise may be promoted in the driving device requiring instantaneous power.

In addition, in the present invention, a thin-diameter wire is wound in a two-strand winding method, thereby ensuring a desired number of coil turns, thereby implementing a desired high-speed RPM, thereby improving performance of the driving device.

Hereinafter, referring to Table 1 below, the operation of the BLDC motor 200 designed in accordance with the three-connection method of this invention will be described with reference to FIGS. 6A to 7. Table 1 below is a logic table applied when the switching elements FET1-FET6 of the inverter circuit 50 are selectively activated when the BLDC motor 200 is driven in a six-step manner.

TABLE 1

| Electrical angle | 0° | 60° | 120° | 180° | 240° | 300° | 360°, 0° |
|---|---|---|---|---|---|---|---|
| Mechanical angle | 0° | 12° | 24° | 36° | 48° | 60° | 72°, 0° |
| H1 | N | S | S | S | N | N | N |
| H2 | N | N | N | S | S | S | N |
| H3 | S | S | N | N | N | S | S |
| Input | V | V | W | W | U | U | V |
| Output | W | U | U | V | V | W | W |
| Upper FET | FET3 | FET3 | FET5 | FET5 | FET1 | FET1 | FET3 |
| Lower FET | FET2 | FET4 | FET4 | FET6 | FET6 | FET2 | FET2 |

The BLDC motor 200 illustrated in FIG. 6D shows a state at 0°. The direction of the current flowing through the stator coils U1-U6, V1-V6, and W1-W6 is changed and the direction-changed current is applied every 12° of the mechanical angle in a 6-step manner. Accordingly, a rotating magnetic field is generated by selectively activating the corresponding stator coils U1-U6, V1-V6, and W1-W6. The motor driving circuit includes a controller (not shown) and an inverter circuit 50. The inverter circuit 50 is configured such that three pairs of power switching elements FET1-FET6 are connected to each other by a totem pole. Outputs U, V, and W of the respective phases are generated from the respective connection points between one of the upper power switching elements FET1, FET3, and FET5 and one of the lower power switching elements FET4, FET6, and FET2, respectively, and are applied to the stator coils U1-U6, V1-V6, and W1-W6 of the BLDC motor 200.

When the BLDC motor 200 is driven by a three-phase driving method, the stator 140 includes six coils U1-U3, U4-U6, V1-V3, V4-V6, W1-W3, and W4-W6 connected in parallel for each phase as shown in FIG. 7. For example, in the case of a star connection structure, the other ends of the coils are interconnected to form a neutral point NP.

The BLDC motor 200 selectively drives two of the three pairs of switching elements connected by the totem pole based on the position signal of the rotor 130. Accordingly, by sequentially applying current to two of the U-phase, V-phase, and W-phase coils U1-U3, U4-U6, V1-V3, V4-V6, W1-W3, and W4-W6, the two-phase stator coils are sequentially excited to generate a rotating magnetic field, thereby enabling the rotation of the rotor. That is, a driving signal is applied to one-phase coils from an output of the inverter circuit 50, and the other one-phase coils are connected to the neutral point NP.

When a position signal of the rotor 130 is detected by the Hall elements H1-H3 at each angle, the controller (not shown) of the motor driving circuit 50 sets a current flow path by turning on a pair of switching devices FETs according to Table 1.

For example, when the Hall elements H1-H3 detects the polarity of the rotor 130 as "N, N, S" as shown in FIG. 7, the controller determines that the rotation position of the rotor 130 is 0° according to Table 1. Accordingly, when a driving signal is applied to turn on the upper FET3 and the lower FET2, current flows to the ground via the FET3-parallel connected V-phase coils V1-V3/V4-V6-neutral point-parallel connected W-phase coils W3-W1/W6-W4-FET2.

Accordingly, the teeth T17 generate a magnetic flux in an inward direction, the teeth T18 generate a magnetic flux in an outward direction, and the teeth T19 generate a magnetic flux in an inward direction. As a result, as indicated by arrows, the magnetic circuits are set, and the rotor 130 rotates clockwise.

That is, in the BLDC motor 200 of FIG. 6D, the teeth T17-T19 in which the V-phase coils V1-V3 are three-connected to serve as an electromagnet, and teeth placed at the right side of the teeth T17-T19 are arranged oppositely in the same polarities as S-S, N-N, and S-S, with respect to the magnets 218-220 facing the rotor 130. Accordingly, a large repulsive force is generated between each of the teeth T17-T19 and the rotor 130.

In addition, teeth placed at the left side of the teeth T17-T19 are arranged oppositely in the opposite polarities as S-N, N-S, and S-N, with respect to the magnets 217-219 facing the rotor 130 in which the left side of the teeth T17-T19 has a relatively smaller area than the right side of the teeth T17-T19. Accordingly, a small attractive force is generated between each of the teeth T17-T19 and the rotor 130.

Therefore, since a small attractive force and a large repulsive force are simultaneously generated between each of the teeth T17-T19 and the rotor 130, an action of rotating the rotor 130 in a clockwise direction occurs.

In addition, in the teeth T14-T16 in which the W-phase coils W1-W3 are connected by the 3-connection method, which is arranged at the rear end and adjacent to the teeth T17-T19 in which the V-phase coils V1-V3 are connected by the 3-connection method, teeth placed at the left side of the teeth T14-T16 are arranged oppositely in the different polarities as N-S, s-N, and N-S, with respect to the magnets 214-216 facing the rotor 130, and teeth placed at the right side of the teeth T14-T16 are arranged oppositely in the same polarities as N-N, S-S, and N-N, with respect to the magnets 215-217 facing the rotor 130. Therefore, since an attractive force and a repulsive force are generated between each of the teeth T14-T16 and the rotor 130, an action of rotating the rotor 130 in a clockwise direction occurs simultaneously.

Moreover, a repulsive force and an attractive force are generated in the same manner as described above, between each of the teeth T26-T28 in which the V-phase coils V4-V6 are connected by the 3-connection method and the teeth T23-T25 in which the W-phase coils W6-W4 are connected by the 3-connection method, and the rotor 130, which are arranged at opposite positions facing the teeth T17-T19 in which the V-phase coils V1-V3 are connected by the 3-connection method and the teeth T14-T16 in which the W-phase coils W3-W1 are connected by the 3-connection method. Therefore, the rotor 130 is rotated clockwise by actions of pushing and pulling the rotor 130.

Thereafter, the rotor 130 rotates by 12° at a mechanical angle, and the Hall elements H1-H3 detect the polarities of the rotor 130 as "S, N, and S". Accordingly, the controller determines that the rotation position of the rotor 130 is 12° at a mechanical angle according to Table 1. Accordingly, when the controller applies a driving signal to turn on the upper FET3 and the lower FET4, current flows to the ground via the FET3-parallel connected V-phase coils V1-V3/V4-V6-neutral point-parallel connected U-phase coils U3-U1/U6-U4-FET4.

Accordingly, the teeth T17 generate a magnetic flux in an inward direction, the teeth T18 generate a magnetic flux in an outward direction, and the teeth T19 generate a magnetic flux in an inward direction. As a result, as indicated by arrows, the magnetic circuits are set, and the rotor 130 rotates clockwise.

That is, in the teeth T17-T19 connected by the 3-connection method in the BLDC motor 200, teeth placed at the left side of the teeth T17-T19 are arranged oppositely in the different polarities as S-N, N-S, and S-N, with respect to the magnets 217-219 facing the rotor 130, and teeth placed at the right side of the teeth T17-T19 are arranged oppositely in the same polarities as S-S, N-N, and S-S, with respect to the magnets 218-220 facing the rotor 130. Therefore, since an attractive force and a repulsive force are simultaneously generated between each of the teeth T17-T19 and the rotor 130, an action of rotating the rotor 130 in a clockwise direction occurs.

In addition, in the teeth T20-T22 in which the U-phase coils U1-U3 are connected by the 3-connection method, which is arranged at the front end and adjacent to the teeth T17-T19 in which the V-phase coils V1-V3 are connected by the 3-connection method, teeth placed at the left side of the teeth T20-T22 are arranged oppositely in the different polarities as N-S, S-N, and N-S, with respect to the magnets 220-222 facing the rotor 130, and teeth placed at the right side of the teeth T20-T22 are arranged oppositely in the same polarities as N-N, S-S, and N-N, with respect to the magnets 221-223 facing the rotor 130. Therefore, since an attractive force and a repulsive force are simultaneously generated between each of the teeth T17-T19 and the rotor 130, an action of rotating the rotor 130 in a clockwise direction occurs.

In addition, a repulsive force and an attractive force in the same as described above are generated between each of the teeth T26-T28 connected by the 3-connection method and the teeth T11-T13 connected by the 3-connection method, which are arranged at the positions facing the teeth T17-T19 connected by the 3-connection method and the teeth T20-T22 connected by the 3-connection method, respectively. Therefore, the rotor 130 is rotated clockwise by actions of pushing and pulling the rotor 130.

As described above, in this invention, each of the core groups G1-G6 includes a reverse coil winding on the teeth positioned in the middle of the three consecutive teeth of each phase, and at each driving step, two adjacent core groups placed symmetrically on both sides around the axis of rotation, i.e., a pair of consecutive six teeth, are activated, and Three consecutive teeth arranged between a pair of consecutive six teeth have an inactive state.

For example, when the rotation position of the rotor 130 is 0° as shown in FIG. 6D, the teeth T17-T19 (i.e., G3) in which the V-phase coils V1-V3 are connected by the 3-connection method, the teeth T14-T16 (i.e., G2) in which the W-phase coils W1-W3 are connected by the 3-connection method, the teeth T26-T28 (i.e., G6) in which the V-phase coils V4-V6 are connected by the 3-connection method, and the teeth T23-T25 (i.e., G5) in which the W-phase coils W4-W6 are connected by the 3-connection method are activated, and the teeth T11-T13 (i.e., G1) in which the U-phase coils U1-U3 are connected by the 3-connection method, and the teeth T20-T22 (i.e., G4) in which the U-phase coils U4-U6 are connected by the 3-connection method are in an inactive state.

In this case, when a driving signal is applied to each of the two adjacent core groups and the two adjacent core groups are activated, the six teeth included in the two core groups generate magnetic fluxes in opposite directions. In addition, in one of the two adjacent core groups in which the activation is made, the driving signal is applied from the start terminal of the coil, and in the other of the two adjacent core groups, the driving signal is applied from the end terminal of the coil.

In addition, in the six consecutive teeth in which activation takes place between the rotor 130 and the teeth, the teeth placed in the left side of the teeth are set to the opposite polarities, and thus the rotor 130 is pulled in the rotating direction by attraction, and the teeth placed in the right side of the teeth are set to the same polarities, and thus an action of pushing the rotor 130 in the rotation direction is performed by a repulsive force.

That is, all three consecutive teeth of each of the four core groups generate a magnetic flux that rotates the magnets of the opposing rotor 130 in the same direction, thereby effectively transmitting a force to the rotor.

In addition, in the present invention, six consecutive teeth are simultaneously activated, and the six activated teeth generate magnetic fluxes in opposite directions, and thus even when a boundary surface is disposed between adjacent S-pole and N-pole magnets in the rotor 130 facing the teeth of the stator, an effective magnetic circuit path is set without magnetic flux loss to rotate and drive the rotor 130. As a result, split-magnetized magnets may be used without rounding the corners of adjacent S-pole and N-pole magnets, and thus the effective area of the magnets 211-230 corresponding to the teeth T11-T28 may increase and efficiency may be increased.

In addition, in the present invention, coil winding is performed such that a pair of six consecutive split cores generate magnetic fluxes in opposite directions between adjacent split cores, and as the driving signal is applied, even if an interval between one core and another core is set small, there is no magnetic flux leakage due to cogging. The effective area between the magnet and the core (teeth) is increased to reduce the leakage magnetic flux, thereby promoting efficiency.

Conventionally, it has been required to increase the opening width between a slot and another slot and to round (R-process) the outer circumferential surface. However, In this invention, even if the respective tooth are not rounded, and the curvature is set to coincide with one outer circle formed by the entire 18 teeth, cogging does not occur significantly. As a result, the effective area between the magnet and the core (teeth) is increased at the maximum to reduce the leakage magnetic flux, thereby promoting efficiency.

In the present invention, when the three-phase coils are wound on the teeth of the integrated stator core by a three-connection method, all coil windings are continuous at once, and thus the coil winding may be performed without a connection point. In this case, in the embodiment illustrated in FIGS. 6C and 6D, each of the core groups G1 to G6 is wound to be arranged clockwise on the teeth of the stator core in the order of G1 to G6. However, it is also possible to arrange the core groups clockwise in the order of G1-G3-G5-G4-G6-G2.

In the above-described embodiment, when winding the coils on the teeth of the stator core, it has been illustrated that winding is performed in the order of G1-G2-G5-G6-G3-G4. However, It is also possible to place core groups in the order of G1-G3-G5-G4-G6-G2 and wind coils in the order of G1-G2-G5-G3-G6-G4.

In this invention, as illustrated in FIGS. 6C and 6D, instead of arranging the three winding coils in the order of a U-phase core group, a W-phase core group, and a V-phase core group, it is also possible to arrange three winding coils in the order of a U-phase core group, a V-phase core group, and a W-phase core group.

In the present invention, the arrangement of the core groups is required to satisfy a condition in which the corresponding core groups of each phase are arranged symmetrically at positions opposite to each other around a rotation axis.

Meanwhile, the hub-type electric driving device 100 according to this invention includes the cable 180 having therein three wires for transmitting a driving signal for three-phase (U, V, W) driving, five wires for transmitting a rotor rotation position sense signal from the Hall sensor assembly 170 to a motor driving circuit (not illustrated), and two wires for temperature sensing.

In the BLDC motor 200, a three-phase (U, V, W) driving signal is applied from the motor driving circuit outside the housing to the stator inside the housing for three-phase (U, V, W) driving from the outside of the housing 110 into the housing, and the rotor rotation position sense signal and the internal temperature value of the motor are sensed from the Hall sensor assembly 170 installed inside the housing 110 and then transmitted to the motor driving circuit.

The hub-type electric driving device 100 needs to maintain a sealing state when a cable containing a plurality of wires is introduced into or withdrawn from the housing, and the present invention completes a cable sealing structure using a cable guide assembly.

Hereinafter, the cable guide assembly according to the present invention will be described with reference to FIGS. 8A to 8D.

First, through-holes are formed in the center of the wheel 110 and the cover 112 forming the housing 110, respectively. First and second bearing housings 111b and 112a are formed on the outer circumferences of the through-holes, respectively. First and second bearings 161 and 162 are installed in the first and second bearing housings 111b and 112a, respectively. It is preferable that the first and second bearings 161 and 162 are formed of ball bearings.

In this case, the first bearing 161 has a larger diameter than the second bearing 162, and the cable guide assembly 190 is installed in the inner circumference of the first bearing 161. That is, the first bearing 161 is formed to have a diameter larger than that of the second bearing 162 so that the cable guide assembly 190 through which the cable 180 passes may be installed.

The cable guide assembly 190 includes a cable guide bracket 191, a silicon rubber ring 192, a cable bracket cover 198, and O-rings 195, 196, and 197.

The cable guide bracket 191 made of a metal material is coupled to an inner circumference of the first bearing 161, and the O-ring 196 is inserted into a groove provided on the outer circumference of the cable guide bracket 191. Thus, a sealing state is set between the first bearing 161 and the cable guide bracket 191. The cable guide bracket 191 may be made of, for example, an aluminum alloy, and may be molded by a die casting method.

The cable guide bracket 191 includes a shaft through-hole 193 through which the motor shaft 120 is penetrated and coupled, and a cable through-hole 194 through which the cable 180 passes by being biased to one side from the shaft through-hole 193. A cylindrical tube 191b extends from a body 191a to the outside of the wheel 110 so that the shaft through-hole 193 has a length longer than the cable through-hole 194, and a sealing stopper 199 is coupled to the motor shaft 120 at the front end of the cylindrical tube 191b, to limit the movement of the cable guide bracket 191 and supplement the sealing state.

A groove 191c is lengthily formed at an inlet of the cable through-hole 194 on the cylindrical tube 191b so that the cable 180 may be easily inserted into or withdrawn from the cable through-hole 194.

An annular flange 191d serving as a stopper protrudes from the inside of the wheel 110 of the cable guide bracket 191, and the flange 191d is caught by an inner circumference of the first bearing 161.

An annular groove is formed in the flange 191d, and an annular cable bracket cover 198 is coupled to the annular groove. The cable bracket cover 198 may be made of a synthetic resin, and has two through-holes corresponding to the shaft through-hole 193 and the cable through-hole 194 of the cable guide bracket 191. The rear end part of the cable bracket cover 198 is inserted into the annular groove 191e of the flange 191d and the front end part thereof is provided with a cylindrical extension part 198a extending into the cable through-hole 194.

The cable guide bracket 191 includes a stepped part 191f having an inner diameter larger than an inner diameter of the cable through-hole 194 by a predetermined length from the inlet of the cable through-hole 194 inside the housing to which the cable bracket cover 198 is coupled.

The O-ring 195 is inserted into a groove provided on the outer circumference of the motor shaft 120 passing through the shaft through-hole 193 of the cable guide bracket 191 to sealably couple between the shaft through-hole 193 and the motor shaft 120, and the silicon rubber ring 192 having elasticity and flexibility is inserted into the cable through-hole 194 to seal the cable through-hole 194. The silicon rubber ring 192 has a predetermined width, and a plurality of protrusions protruding from the inner side thereof are press-coupled to the outer circumference of the cable 180, thereby serving as a cable seal for setting the gap between the cable through-hole 194 and the cable 180 in a tight sealing state.

The silicone rubber ring 192 is compressed by the extension part 198a of the cable bracket cover 198 according to the assembly of the cable bracket cover 198, thereby limiting the installation position of the stepped portion 191f.

In the present invention, the silicon rubber ring 192 inserted into the cable through-hole 194 is compressed and coupled between the outer circumference of the cable 180 and the cable through-hole 194 to maintain the sealing state even if the cable 180 is moved.

In addition, the cable 180 has a predetermined diameter because a plurality of wires are embedded therein. Therefore, the conventional method of passing through the hollow motor shaft has low assembly productivity and difficulty in forming a sealing structure, but according to the present invention, the cable guide bracket 191 having the shaft through-hole 193 and the cable through-hole 194 may be easily and precisely molded by a die casting method using an aluminum alloy, and using the same, the assembly productivity of the cable is high and the formation of the sealing structure is easy.

INDUSTRIAL APPLICABILITY

The present invention may applied to a hub-type driving motor in which a motor is embedded in a wheel which also serves as a motor casing for driving an electric bicycle, an electric vehicle, an electric motorcycle, an electric scooter, an electric kickboard, and the like.

What is claimed is:
1. A hub-type electric driving device comprising:
 a housing having a cup-shaped wheel and a cover having an outer peripheral portion which is coupled to an opening of the wheel;
 a motor shaft having both ends which are fixedly installed on a body outside the housing;

first and second bearings provided respectively in through-holes formed in the centers of the wheel and the cover, in order to rotatably support the housing around the motor shaft; and a BLDC motor which is contained in the housing so as to rotate the housing around the motor shaft, wherein the BLDC motor comprises:

a rotor in which a back yoke and a magnet are stacked on a cylindrical inner wall of the cup-shaped wheel; and a stator of which the outer peripheral part faces the magnet of the rotor while having an air gap therewith and of which the central part is coupled to the outer circumference of the motor shaft so as to be fixed thereto, and which is for applying a rotating magnetic field to the rotor, wherein the stator comprises an integrated core frame in which a plurality of teeth radially extend on the outer circumference of an annular yoke, and an inner race coupled to the motor shaft is connected to the inside of the annular yoke through a plurality of bridges, wherein the stator comprises:

the integrated core frame;

an insulating film surrounding four side surfaces of the plurality of teeth except the outer peripheral surface facing the magnet of the rotor;

first and second insulators, each having an annular body and a plurality of extensions radially extending from the annular body to correspond to the plurality of teeth and the annular yoke, and assembled to one side and the other side of the integrated core frame; and coils wound around the teeth portion surrounded by the insulating film and the first and second insulators, and wherein the first insulator further comprises an annular extension portion extending inward of the annular body, and the annular extension portion includes three nuts embedded to fix a bolt for a bus bar and connected to U-phase, V-phase, and W-phase terminal ends, respectively.

2. The hub-type electric driving device of claim 1, further comprising:

a common terminal which is insert-molded into the annular body so that three common terminal ends protrude above the annular body, and forms a neutral point when three-phase (U, V, W) coils are connected in a Y-connection manner; and the U-phase, V-phase and W-phase terminal ends which are integrally formed in the annular body and are connected to the input ends of the three-phase (U, V, W) coils.

3. The hub-type electric driving device of claim 1, further comprising: a plurality of winding guide protrusions integrally formed in the annular body and serving as a guide of the coils when the coils are wound on the plurality of teeth.

4. The hub-type electric driving device of claim 1, wherein the BLDC motor comprises a single rotor having a 20-pole structure and a single stator having an 18-slot structure;

the stator includes three-phase (U, V, W) coils wound on 18 teeth; each of the three-phase (U, V, W) coils includes six core groups continuously wound on three teeth; and when the three-phase (U, V, W) coils are wound on the 18 teeth with one-time winding, the three-phase (U, V, W) coils are wound so that an input of the core group of each phase is commonly connected to a terminal end of each phase, and an output of the core group of each phase is connected to a common terminal for forming a neutral point.

5. The hub-type electric driving device of claim 1, wherein the stator includes three-phase (U, V, W) coils wound on the plurality of teeth; each of the three-phase (U, V, W) coils includes a plurality of core groups continuously wound on three teeth;

each of the core groups is wound continuously on three consecutive teeth in the order of forward, reverse, and forward; six consecutive teeth of two adjacent phases generate magnetic flux in opposite directions to rotate the magnets of the opposing rotor in the same direction; and when a driving signal is applied to the coil of the stator in a six-step manner, six consecutive teeth of two phases are set to an activated state, and the three consecutive teeth of the remaining one phase arranged between the six consecutive teeth are set to an inactive state.

6. The hub-type electric driving device of claim 1, wherein the stator includes three-phase (U, V, W) coils wound on the plurality of teeth;

each of the three-phase (U, V, W) coils includes a plurality of core groups continuously wound on three teeth; and the core groups of each phase are connected in parallel and are alternately arranged for each phase.

7. The hub-type electric driving device of claim 6, wherein the three-phase (U, V, W) coils which are wound on the plurality of teeth are completely wound with one-time winding.

8. The hub-type electric driving device of claim 6, wherein the three-phase (U, V, W) coils wound on the plurality of teeth are wound using two-strand wires.

9. The hub-type electric driving device of claim 6, wherein six consecutive teeth included in two adjacent core groups are set to the same polarity or opposite polarity as the magnetic pole of the opposing rotor when the drive signal is applied thereto, thereby rotating the rotor in the same direction.

10. The hub-type electric driving device of claim 1, further comprising:

a cable guide assembly installed between the first bearing supporting the wheel and the motor shaft to provide a shaft through-hole and a cable through-hole through which the motor shaft and a cable pass, respectively, and to maintain the sealing state of the shaft through-hole and the cable through-hole; and a cable containing a plurality of wires for applying a motor driving signal to the BLDC motor from a motor driving circuit installed outside the housing.

11. The hub-type electric driving device of claim 10, wherein the cable guide assembly comprises:

a cable guide bracket which is installed between the first bearing and the motor shaft, and has the shaft through-hole formed in the center thereof and through which the motor shaft is penetrated and coupled, and the cable through-hole deflected to one side from the shaft through-hole and through which the cable passes;

a silicon rubber ring inserted into the cable through-hole and fitted to the outer circumference of the cable; and a cable bracket cover fitted into the cable through-hole so that the front end portion thereof fixes the silicone rubber ring.

12. The hub-type electric driving device of claim 11, wherein the cable guide bracket comprises:

a body in which the shaft penetration hole and the cable through-hole are formed;

a cylindrical tube extending from the body to the outside of the wheel so that the shaft through-hole is longer than the cable through-hole; and an annular flange extending inside the wheel and serving as a stopper caught by the inner circumference of the first bearing, wherein the cable through-hole comprises a stepped portion that limits the position of the silicone rubber ring when the cable bracket cover is inserted into the cable through-hole.

13. The hub-type electric driving device of claim 1, further comprising an O-ring which sets a sealing state between the second bearing and the motor shaft.

14. A hub-type electric driving device comprising:

a housing having a cup-shaped wheel and a cover having an outer peripheral portion which is coupled to an opening of the wheel;

a motor shaft having both ends which are fixedly installed on a body outside the housing;

first and second bearings provided respectively in through-holes formed in the centers of the wheel and the cover, in order to rotatably support the housing around the motor shaft; and a BLDC motor which is contained in the housing so as to rotate the housing around the motor shaft, wherein the BLDC motor comprises:

a rotor in which a back yoke and a magnet are stacked on a cylindrical inner wall of the cup-shaped wheel; and a stator of which the outer peripheral part faces the magnet of the rotor while having an air gap therewith and of which the central part is coupled to the outer circumference of the motor shaft so as to be fixed thereto, and which is for applying a rotating magnetic field to the rotor, wherein the stator comprises an integrated core frame in which a plurality of teeth radially extend on the outer circumference of an annular yoke, and an inner race coupled to the motor shaft is connected to the inside of the annular yoke through a plurality of bridges, wherein the BLDC motor comprises a single rotor having a 20-pole structure and a single stator having an 18-slot structure;

the stator includes three-phase (U, V, W) coils wound on 18 teeth; each of the three-phase (U, V, W) coils includes six core groups continuously wound on three teeth; and when the three-phase (U, V, W) coils are wound on the 18 teeth with one-time winding, the three-phase (U, V, W) coils are wound so that an input of the core group of each phase is commonly connected to a terminal end of each phase, and an output of the core group of each phase is connected to a common terminal for forming a neutral point.

* * * * *